(12) United States Patent
Shiohara

(10) Patent No.: US 11,636,295 B2
(45) Date of Patent: Apr. 25, 2023

(54) CONTROL METHOD AND INFORMATION PROCESSING APPARATUS FOR ACTIVATING AN APPLICATION BASED ON A REQSUEST ISSUED BY A PRINTER DRIVER

(71) Applicant: CANON KABUSHIKI KAISHA, Tokyo (JP)

(72) Inventor: Tetsuya Shiohara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/246,286

(22) Filed: Apr. 30, 2021

(65) Prior Publication Data

US 2021/0256331 A1    Aug. 19, 2021

Related U.S. Application Data

(63) Continuation of application No. PCT/JP2019/040476, filed on Oct. 15, 2019.

(30) Foreign Application Priority Data

Nov. 2, 2018    (JP) .............................. JP2018-207404

(51) Int. Cl.
G06K 15/02    (2006.01)
G06F 3/12    (2006.01)
H04N 1/00    (2006.01)

(52) U.S. Cl.
CPC ....... *G06K 15/1805* (2013.01); *G06F 3/1203* (2013.01); *G06F 3/1225* (2013.01);
(Continued)

(58) Field of Classification Search
CPC ............ G06K 15/1805; G06K 15/1806; G06F 3/1203; G06F 3/1225; G06F 3/1256;
(Continued)

(56) References Cited

U.S. PATENT DOCUMENTS 7,167,260 B2 *    1/2007    Iwata .................... G06F 3/1205
710/16
2009/0290185 A1 *    11/2009    Shiohara ............... G06F 3/1208
358/1.13

(Continued)

FOREIGN PATENT DOCUMENTS

JP    2017-016480 A    1/2017
JP    2017-068339 A    4/2017
(Continued)

*Primary Examiner* — Juan M Guillermety
(74) *Attorney, Agent, or Firm* — Canon U.S.A., Inc. IP Division

(57) ABSTRACT

A control method causes a Graphical User Interface (GUI) application to perform activating in response to a first print request from a drawing application, acquiring intermediate data based on drawing data generated by the drawing application, and outputting intermediate data. In a case where a second print request is issued by a printer driver that has acquired intermediate data output from a GUI application, the GUI application is re-activated in response to the second print request, and a predetermined screen is provided by the GUI application that has been activated in response to the second print request issued by the printer driver.

15 Claims, 20 Drawing Sheets

(52) U.S. Cl.
CPC ....... *G06F 3/1256* (2013.01); *G06K 15/1806* (2013.01); *H04N 1/0044* (2013.01)

(58) Field of Classification Search
CPC ........ G06F 3/12; G06F 3/1205; G06F 3/1208; G06F 3/1227; H04N 1/0044; H04N 1/00; B41J 29/38
See application file for complete search history.

(56) References Cited

U.S. PATENT DOCUMENTS

| | | | | |
|---|---|---|---|---|
| 2011/0122441 | A1* | 5/2011 | Shiohara | G06F 3/1227 358/1.18 |
| 2014/0289635 | A1* | 9/2014 | Honda | G06F 3/1256 715/735 |
| 2014/0347692 | A1* | 11/2014 | Iida | G06F 3/1203 358/1.15 |
| 2019/0286402 | A1* | 9/2019 | Shiohara | G06F 3/1205 |

FOREIGN PATENT DOCUMENTS

| | | | |
|---|---|---|---|
| JP | 2017-097667 | A | 6/2017 |
| JP | 2018-026049 | A | 2/2018 |
| JP | 2018-092583 | A | 6/2018 |

* cited by examiner

FIG.6A
```
<psf:Feature name="ns0000:JobPreview">
    <psf:Option name= "ns0000:ON" />
</psf:Feature>
```

FIG.6B
```
<psf:Property name="ns0000:CreatePrvImage">
    <psf:Value xsi:type="xsd:string">Request</psf:Value>
</psf:Property>
```

FIG.6C
```
<psf:Property name="ns0000:CreatePrvImage">
    <psf:Value xsi:type="xsd:string">Created</psf:Value>
</psf:Property>
```

FIG.13

```
<psf:Property name="ns0000:JobID">
   <psf:Value xsi:type="xsd:string">0355BD29-C332-714B-810D-0A4570700A5E</psf:Value>
</psf:Property>
```

FIG.14

```
<JobStatus>
    <ID>0355BD29-C332-714B-810D-0A4570700A5E</ID>  ~1401
    <Status>paper-out</Status >  ~1402
    <Name>TestPrint.prn</Name>  ~1403
    <User>hoge</User>  ~1404
    <TotalPage>3</TotalPage>  ~1405
    <PrintingPage>1</PrintedPage>  ~1406
</JobStatus>
```

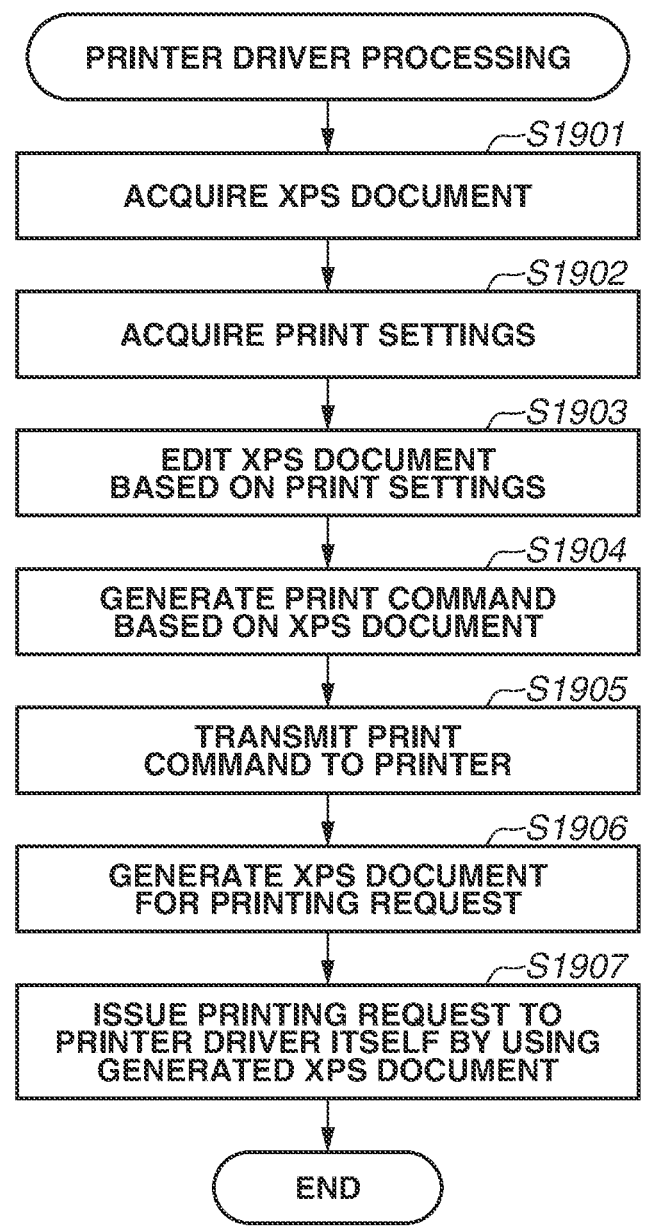

CONTROL METHOD AND INFORMATION PROCESSING APPARATUS FOR ACTIVATING AN APPLICATION BASED ON A REQSUEST ISSUED BY A PRINTER DRIVER

CROSS-REFERENCE TO RELATED APPLICATIONS

This application is a Continuation of International Patent Application No. PCT/JP2019/040476, filed Oct. 15, 2019, which claims the benefit of Japanese Patent Application No. 2018-207404, filed Nov. 2, 2018, both of which are hereby incorporated by reference herein in their entirety.

BACKGROUND OF THE INVENTION

Field of the Invention

The present invention relates to a control method and an information processing apparatus.

Background Art

In a generally known printing configuration, a printer driver installed as printing apparatus control software in a host computer is used to perform printing on a printing apparatus connected to the host computer. Printer drivers are configured according to the specifications prescribed by an operating system (OS) as basic software installed in the host computer. A printer driver is called by the OS and then operates. A printing apparatus vendor provides a printer driver applicable to the specifications of the OS to offer a means for issuing a print instruction to a printer by using the OS. When using Windows (registered trademark) 8 or earlier of Microsoft (registered trademark) as the OS, printer drivers are configured based on what is called the V3 printer driver architecture. V3 printer drivers display a Graphical User Interface (hereinafter referred to as a GUI or simply as a "user interface") at the timing when a print request is issued from the user. This GUI facilitates providing a function of prompting the user to perform a certain operation. For example, when a print request is issued, a predetermined event of a configuration module as a component of V3 printer drivers is called. Then, the configuration module can display a user interface during processing for the event.

A new architecture called the V4 printer driver has recently been released for Windows®. V4 printer drivers focus on security and thus are degraded in customizability of the printer drivers themselves. For example, the above-described configuration module is provided by the OS, and the vendor can provide only setting files and script files for customizing operations of the configuration module. To compensate for such degraded customizability, the printing apparatus vendor can provide a dedicated application for expanding functions of printer drivers. An example of such an application is Windows Store Device App (WSDA). WSDA provided by the printing apparatus vendor makes it possible to customize a print setting screen that is displayed when drawing data is printed, as discussed in Japanese Patent Application Laid-Open No. 2017-16480 (PTL1).

CITATION LIST

Patent Literature

PTL 1: Japanese Patent Application Laid-Open No. 2017-16480

SUMMARY OF THE INVENTION

According to an aspect of the present invention, a method for controlling an information processing apparatus on which a Graphical User Interface (GUI) application capable of providing a GUI operates, the control method causes the GUI application to perform activating in response to a first print request from a drawing application, acquiring intermediate data based on drawing data generated by the drawing application, and outputting intermediate data, wherein, in a case where a second print request is issued by a printer driver that has acquired intermediate data output from the GUI application, the GUI application is re-activated in response to the second print request, and wherein a predetermined screen is provided by the GUI application that has been activated in response to the second print request issued by the printer driver.

Further features of the present invention will become apparent from the following description of exemplary embodiments with reference to the attached drawings.

BRIEF DESCRIPTION OF THE DRAWINGS

FIGS. 6A, 6B, and 6C are diagrams illustrating examples of instruction information to be stored in a PrintTicket.

FIG. 13 is a diagram illustrating an example of job identification information to be stored in a PrintTicket.

FIG. 14 is a diagram illustrating an example of status information acquired from a printing apparatus.

FIG. 19 is a flowchart illustrating printer driver processing according to the second exemplary embodiment.

DESCRIPTION OF THE EMBODIMENTS

Preferred exemplary embodiments of the present invention will be described in detail below with reference to the accompanying drawings. The following exemplary embodiments do not limit the present invention within the scope of the appended claims. Not all of the combinations of the features described in the present exemplary embodiment are indispensable to the solutions for the present invention.

The following exemplary embodiments provide more suitable functions by using an application called Print Workflow Application (WFA). This WFA is a graphical user interface (GUI) application for providing a GUI and is activated in response to a print request (also referred to as a printing-time activated application). The GUI application will be described in detail below.

V4 printer drivers are improved in security and convenience but are degraded in customizability of printer drivers themselves. For example, V4 printer drivers are not have a function of providing a GUI. Even if a driver not having a function of providing a GUI, like V4 printer drivers, is used, a GUI, such as a print setting screen, can be provided by using Windows Store Device App (WSDA). However, conventional WSDA still has limitations on display functions. Although a certain application, what is called Printer Extensions (PEX), expands the function of the printer driver, PEX has similar limitations on functions to WSDA. The present disclosure is directed to a technique for providing more suitable display functions.

First Exemplary Embodiment

Figure 1:
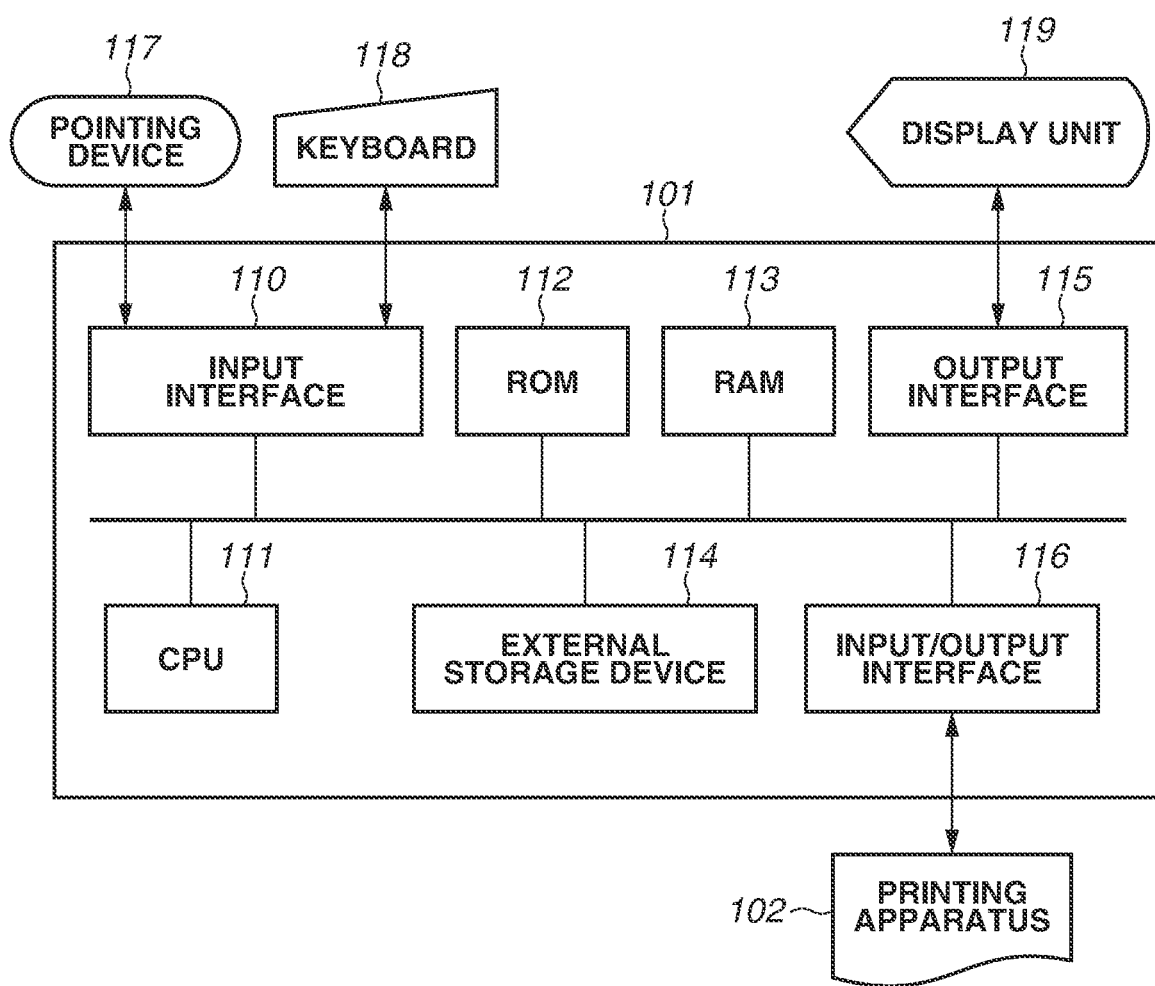
FIG. 1 is a block diagram illustrating a hardware configuration of a printing system.

FIG. 1 is a block diagram illustrating a hardware configuration of a printing system. Referring to FIG. 1, a host computer 101 is an example of an information processing apparatus capable of operating a GUI application. The host computer 101 includes an input interface 110, a central processing unit (CPU) 111, a read only memory (ROM) 112, a random access memory (RAM) 113, an external storage device 114, an output interface 115, and an input/output interface 116. The input interface 110 is connected with input devices such as a keyboard 118 and a pointing device 117. The output interface 115 is connected with a display device such as a display unit 119.

The ROM 112 stores the initial program. The external storage device 114 stores application program groups, an operating system (OS), printer drivers, and other various data. The RAM 113 is used as a work memory when various programs stored in the external storage device 114 are executed.

According to the present exemplary embodiment, by the CPU 111 executing processing according to procedure of a program stored in the ROM 112, the function of the host computer 101 (described below) and processing related to flowcharts (described below) are implemented. A printing apparatus 102 as a device is connected to the host computer 101 via the input/output interface 116. While, in this case, the host computer 101 and the printing apparatus 102 are configured as separate apparatuses, these apparatuses may be configured as one information processing apparatus.

<Block Configuration of Driver Printing System>

Figure 2:
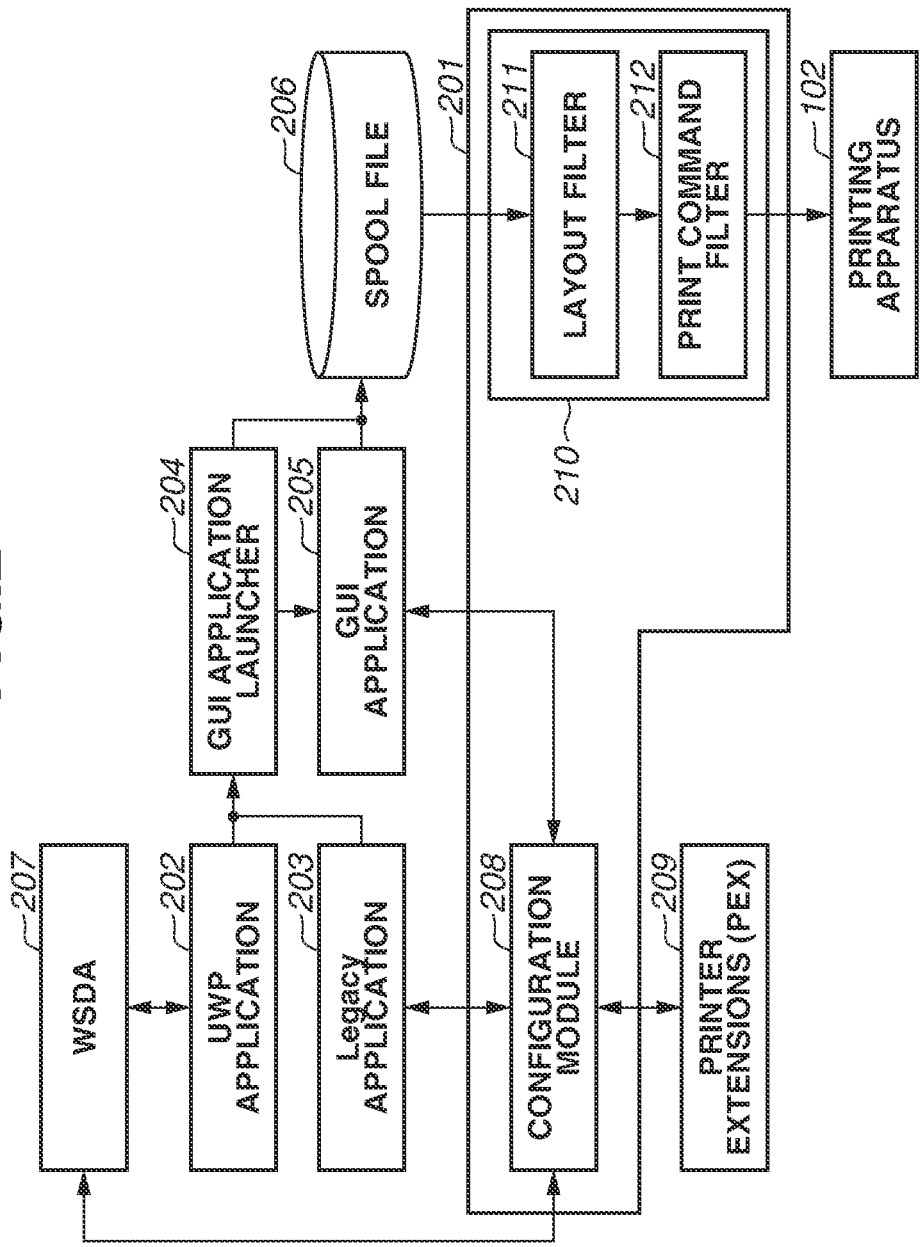
FIG. 2 is a block diagram illustrating a driver printing system.

FIG. 2 is a block diagram illustrating a driver printing system. The following descriptions will be made on the premise of a printing system operating based on what is called the V4 printer driver architecture by using the host computer 101 mounting the OS of Windows® 8 or later of Microsoft®. An example of a printer driver according to the present exemplary embodiment will be described below centering on a model-specific printer driver that is a printer driver dedicated for a model of the printing apparatus 102 provided by a printer vendor. However, the printer driver according to the present exemplary embodiment is not limited to a model-specific printer driver. For example, the printer driver according to the present exemplary embodiment may be a common printer driver that is provided from a printer vendor and is applicable to a plurality of types of printing apparatuses of the printer vendor. The printer driver according to the present exemplary embodiment may be a driver provided together with an OS as a packaged function of the OS, and may be a class driver (standard printer driver using a standardized printing method) that can be commonly used for printing apparatuses provided by a plurality of vendors.

When the user issues a print instruction from a Universal Windows Platform (UWP) application 202, a predetermined screen is displayed by a Modern Print Dialog (MPD) (not illustrated) as a function of the OS. The UWP application 202 is a drawing application for generating drawing data (data including images, texts, and other objects input by the user). A screen provided by the MPD has a print preview function that allows the user to check a print result on a screen and a function that allows the user to select basic print settings.

Figure 3A:
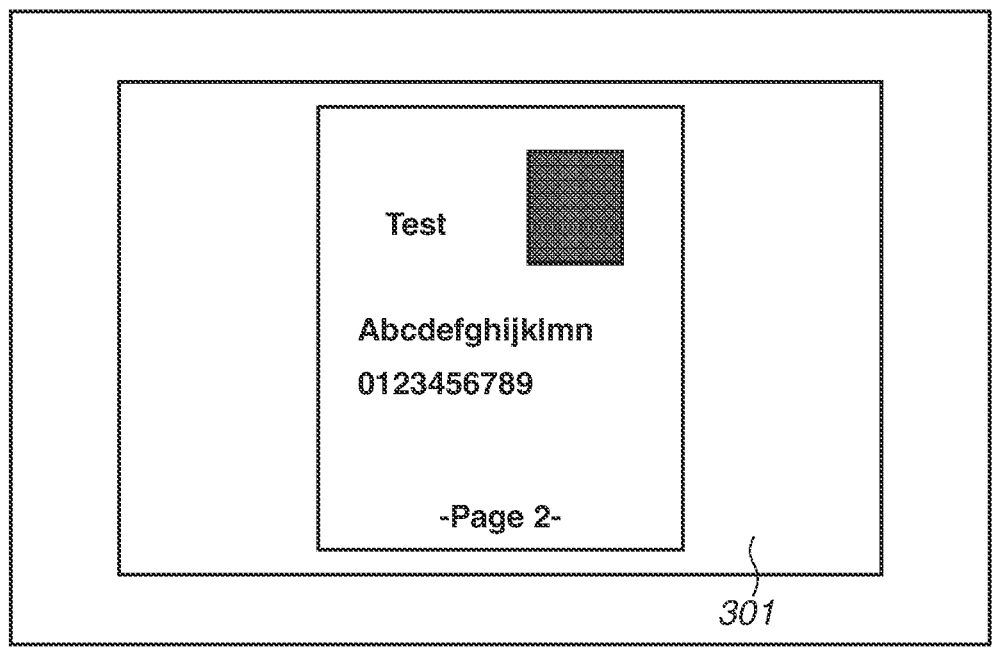
FIGS. 3A, 3B, and 3C are diagrams schematically illustrating screens for issuing a print instruction.
Figure 3B:
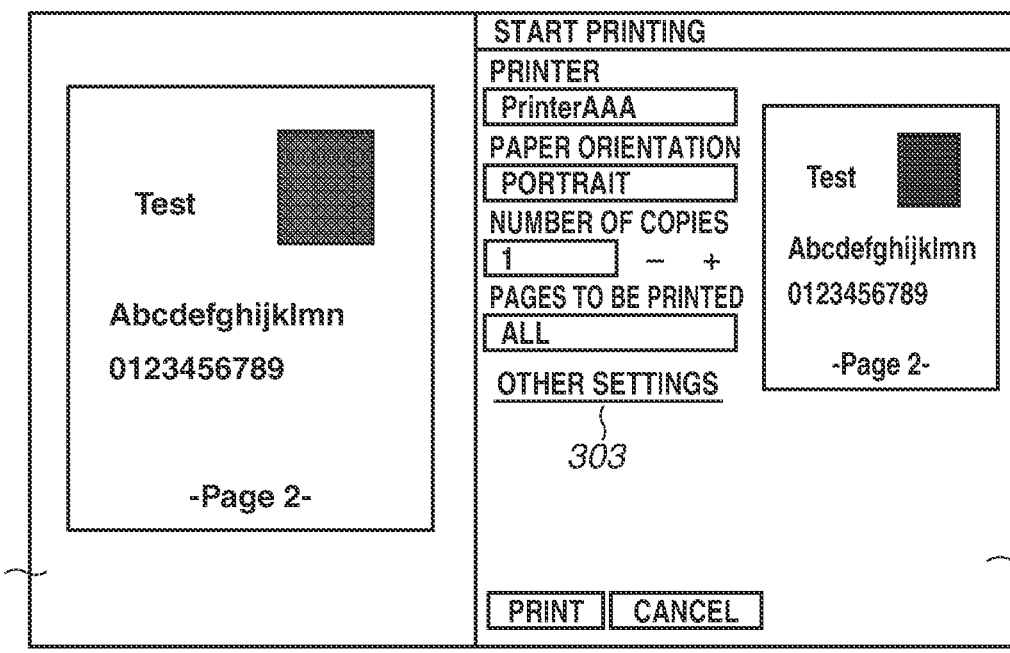
Figure 3C:
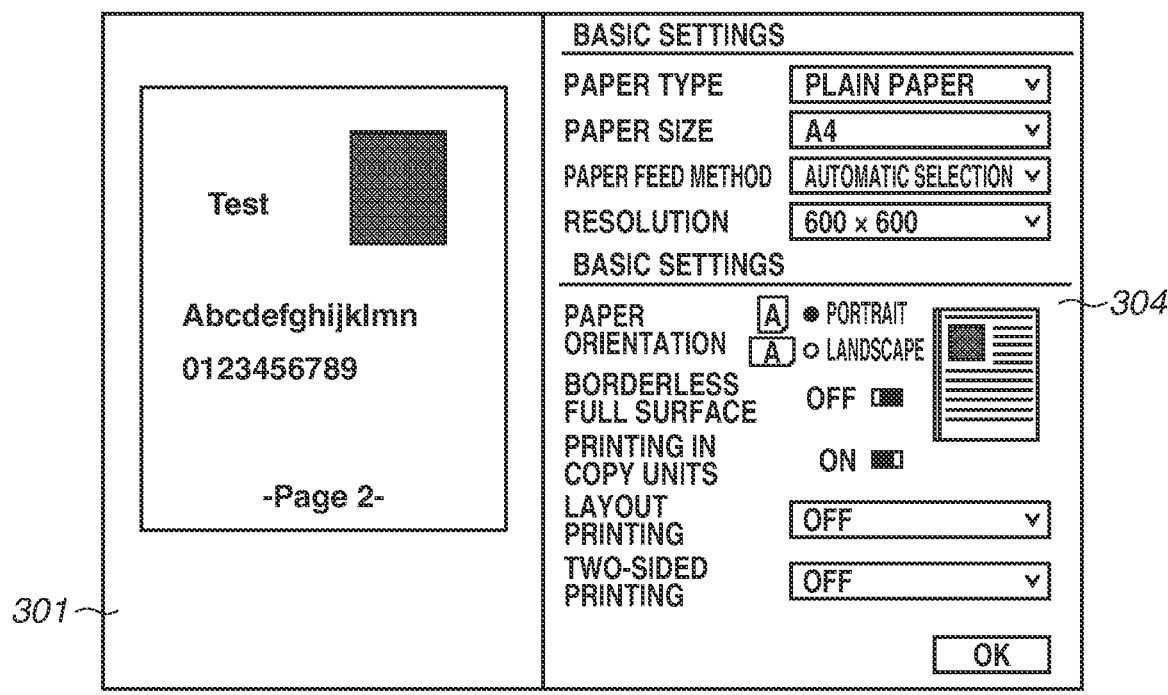

FIGS. 3A to 3C are diagrams illustrating examples of specific screens displayed when print settings are made. When a print instruction is issued in a screen 301 (FIG. 3A) provided by the UWP application 202 as a drawing application, a setting screen 302 (FIG. 3B) is displayed by the MPD of the OS. In the setting screen 302, the user can select a driver to be used. In the setting screen 302, the user can also specify basic print settings.

Upon reception of an instruction from the user, the MPD activates Windows Store Device Application (WSDA) 207 that allows the user to select detailed print settings. More specifically, when an "OTHER SETTINGS" button 303 is selected in the setting screen 302 illustrated in FIG. 3B, a detail setting screen 304 provided by the WSDA 207 illustrated in FIG. 3C is displayed. On the detail setting screen 304, the user can specify more detailed print settings. The WSDA 207 is an application for expanding the function of a printer driver 201 provided by a printing apparatus vendor (hereinafter referred to as a printer vendor). Referring to FIG. 3C, an image appearing like a document image displayed on the right side in the detail setting screen 304 provided by the WSDA 207 is a sample image originally included in the WSDA 207. More specifically, the sample image is not a preview image based on drawing data generated by the UWP application 202 but a sample image that remains unchanged even in a case where drawing data is changed. The setting screen illustrated in FIG. 3B may have a display item for allowing the user to set the print preview function to ON and OFF.

The WSDA 207 receives information indicating the print settings from the MPD, changes the setting information according to the user settings, and returns the setting information to the MPD. The information indicating print settings is described in the eXtended Markup Language (XML) format based on the format defined by the OS, and is included in data called a PrintTicket. The WSDA 207 can refer to and change a PrintTicket but cannot refer to drawing data.

A PrintTicket is generated by a configuration module 208 of the selected printer driver 201. The WSDA 207 generates (edits) a PrintTicket reflecting user specification, by calling the configuration module 208. The configuration module 208 also has functions that can be set for the selected printer driver 201 and a function of generating PrintCapabilities that is described in the XML format based on the format defined by the OS. The WSDA 207 and a Printer Extensions (PEX) 209 (described below) provide user interfaces based on information described in the PrintCapabilities. A GUI application 205 (described below) can acquire PrintCapabilities generated by the configuration module 208 via a function of the OS.

While FIG. 2 illustrates the configuration module 208 as a function of the printer driver 201, the configuration module 208 is an original component of the OS. However, since V4 printer drivers do not have the configuration module 208, V4 printer drivers use the configuration module 208 (a component of the OS) as a configuration module of the drivers. The printer vendor can customize operations of the configuration module 208 by using GPD (not illustrated) and JAVA® script Constraint included in the printer driver 201.

When a "PRINT" button is selected in the setting screen 302 provided by the MPD of the OS after the print settings illustrated in FIGS. 3A to 3C are made, a print request is issued. When the user issues a print instruction on the MPD, the UWP application 202 receives a request from the MPD and generates print data required for printing. The print data is an XML Paper Specification (XPS) document described in the XML Paper Specification (XPS) format, and is also referred to as XPS data or intermediate data. The print data according to the present exemplary embodiment includes the above-described PrintTicket and drawing data generated by a drawing application.

The XPS document generated by the UWP application 202 is transferred to a GUI application launcher 204 as a component of the OS. The GUI application launcher 204 determines whether the GUI application 205 associated with the printer driver 201 via Device Metadata (hereinafter also simply referred to as Metadata) exists and is configured to be activated. When the GUI application launcher 204 determines that the GUI application 205 exists and is configured to be activated, the GUI application 205 is activated. Meanwhile, when the GUI application 205 does not exist, the GUI application launcher 204 stores the XPS document as a spool file 206.

The relation between the WSDA 207 and the GUI application 205 will be described below. The WSDA 207 is an expansion application for expanding a function of the printer driver. More specifically, when a driver not having a function of offering a Graphical User Interface like V4 printer drivers is selected, the WSDA 207 can provide a GUI such as a setting screen. However, the WSDA 207 cannot provide a function for promoting the user for a certain operation by displaying a GUI at the timing of when a print request is issued from the user, like V3 printer drivers. Thus, the present exemplary embodiment uses the GUI application 205 that operates in response to a print request from the user. According to the present specification, a Graphical User Interface is referred to as a "GUI" or simply as a "user interface".

The GUI application 205, called Print Workflow Application, is an expansion application for expanding a function of the printer driver 201 provided by a printer vendor like the WSDA 207. More specifically, when a driver not having a function of providing a GUI like V4 printer drivers is selected, the GUI application 205 can provide a GUI, based on an instruction of the OS. When a V3 driver having a function of providing a GUI is selected, the OS does not activate the GUI application launcher 204 but stores the XPS document generated by the drawing application, as the spool file 206. More specifically, when a V3 driver is selected, the GUI application 205 does not activate and also does not provide a GUI.

The WSDA 207 and the GUI application 205 are not provided as components of the printer driver 201 but independent applications. The WSDA 207 and the GUI application 205 can be collectively configured as an application. For convenience, however, these applications will be described below as separate applications to describe differences from the conventional WSDA.

The WSDA 207 and the GUI application 205 are normally acquired from an application distribution system (a server managed by Microsoft®) via the Internet by the OS. The printer vendor provides Metadata in advance to a Metadata server managed by Microsoft®. Accordingly, appropriate applications, the WSDA 207 and the GUI application 205, are automatically installed in the host computer 101. More specifically, Metadata describes device identification information (Hardware ID) for a printing apparatus as a device, and software identification information (Identity Name) for the WSDA 207 and the GUI application 205. An Inf file of the printer driver describes the device identification information (Hardware ID). Thus, when a printer driver is installed, the OS downloads corresponding Metadata, based on the device identification information. Then, the OS refers to the Metadata, identifies software identification information (Identity Name) associated with corresponding device identification information (Hardware ID), and acquires corresponding applications, the WSDA 207 and the GUI application 205. Thus, the printer driver 201, the WSDA 207, and the GUI application 205 are associated with each other.

The GUI application 205 can display a user interface for accepting an operation instruction from the user. The GUI application 205 can receive an XPS document as print data and edit a PrintTicket and drawing data in the XPS document. The WSDA 207 that is also an expansion application can display a user interface but cannot acquire an XPS document. The WSDA 207 can neither refer to nor edit the drawing data in the XPS document.

When the GUI application 205 outputs an XPS document edited as required, the OS stores the XPS document as the spool file 206. When the spool file 206 is stored, processing is transferred to a filter pipeline manager (not illustrated) in the printer driver 201, and the number and the order of filters are controlled according to a configuration file (not illustrated). The filter pipeline manager is a mechanism for performing printing via a plurality of filters. A filter group according to the present exemplary embodiment includes a layout filter 211 as a layout processing unit, and a print command filter 212 as a print command conversion unit. While the filter pipeline manager operates as a function of the printer driver 201, the filter pipeline manager is an original component of the OS. However, since V4 printer drivers do not have the filter pipeline manager, V4 printer drivers use, as a driver function, the filter pipeline manager as a component of the OS.

The layout filter 211 inputs an XPS document stored in the spool file 206, performs page layout processing based on print setting information, and outputs the XPS document in which the layout processing has been completed. The layout processing includes layout printing for printing a plurality of pages on a single paper surface, and poster printing for printing a single page on a plurality of paper surfaces.

The print command filter 212 has a function of inputting an output from the layout filter 211, converting the XPS document as intermediate data into a print command that can be interpreted by the printing apparatus 102, according to the print setting information, and outputting the print command. In a case where the print command filter 212 once converts the input XPS document into image data, the print command filter 212 is generally referred to as a rendering filter. A rendering filter is generally seen in printer drivers for inexpensive raster printers represented by ink jet printers. When the print command filter 212 operates as a rendering filter, the print command filter 212 once converts the input XPS document into image data. Then, after the image data is subjected to the process of image processing, such as color space conversion and binarization, the image data is converted into a print command that can be interpreted by raster printers.

In a case where XPS is included in the types of print commands that can be interpreted by the printing apparatus 102 of high-performance printers represented by page printers, the print command filter 212 edits the input XPS document and outputs an XPS document. In a case where processing by the print command filter 212 is not required, the print command filter 212 may output the input XPS document as it is, or the print command filter 212 may not be included in the printer driver 201. This completes the description of basic processing in printing using the UWP application 202.

In a case where the drawing application is a Legacy application 203 such as a Win32 application, not the WSDA 207 but the PEX 209 is activated. The PEX 209 is activated via the configuration module 208 and provides a user interface on which the user can specify print settings. The PEX 209 may be provided as a component in the driver package together with the printer driver 201 or separately distributed. Like the WSDA 207, the PEX 209 can refer to and change a PrintTicket but cannot acquire an XPS document. The PEX 209 can neither refer to nor edit drawing data in an XPS document. The PEX 209 is activated when the user issues a print instruction on the Legacy application 203 and is not necessarily activated at the time of printing. When the user issues a print instruction on the Legacy application 203, the Legacy application 203 generates an XPS document as print data. Then, the GUI application 205 acquires the XPS document output from the Legacy application 203 and then outputs the XPS document. The subsequent processing procedure is similar to the print processing using the UWP application 202, and the redundant description thereof will be omitted.

<Configuration of XPS Document>

An XPS document will be described below with reference to FIG. 4. An XPS document has a tree structure including FixedDocumentSequence (hereinafter referred to as FDS) as the root. FDS includes a plurality of FixedDocument (hereinafter referred to as FDs), and FD includes a plurality of FixedPage (hereinafter referred to as FPs). FP describes the page contents of a document in the XML format and includes the contents to be actually displayed or printed. FDS, FD, and FP may be referred to as XPS parts. Fonts, images, and other resources to be used in page contents of FP can be shared by a plurality of FPs. In FDS, FD, and FP, print settings can be held in a PrintTicket. Print settings to be used when printing each FP are held in a PrintTicket as a result of merging a PrintTicket of FDS, a PrintTicket of parent FD of printing target FP, and a PrintTicket of printing target FP. PrintTicket of FDS is also referred to as PrintTicket of a job.

Figure 4:
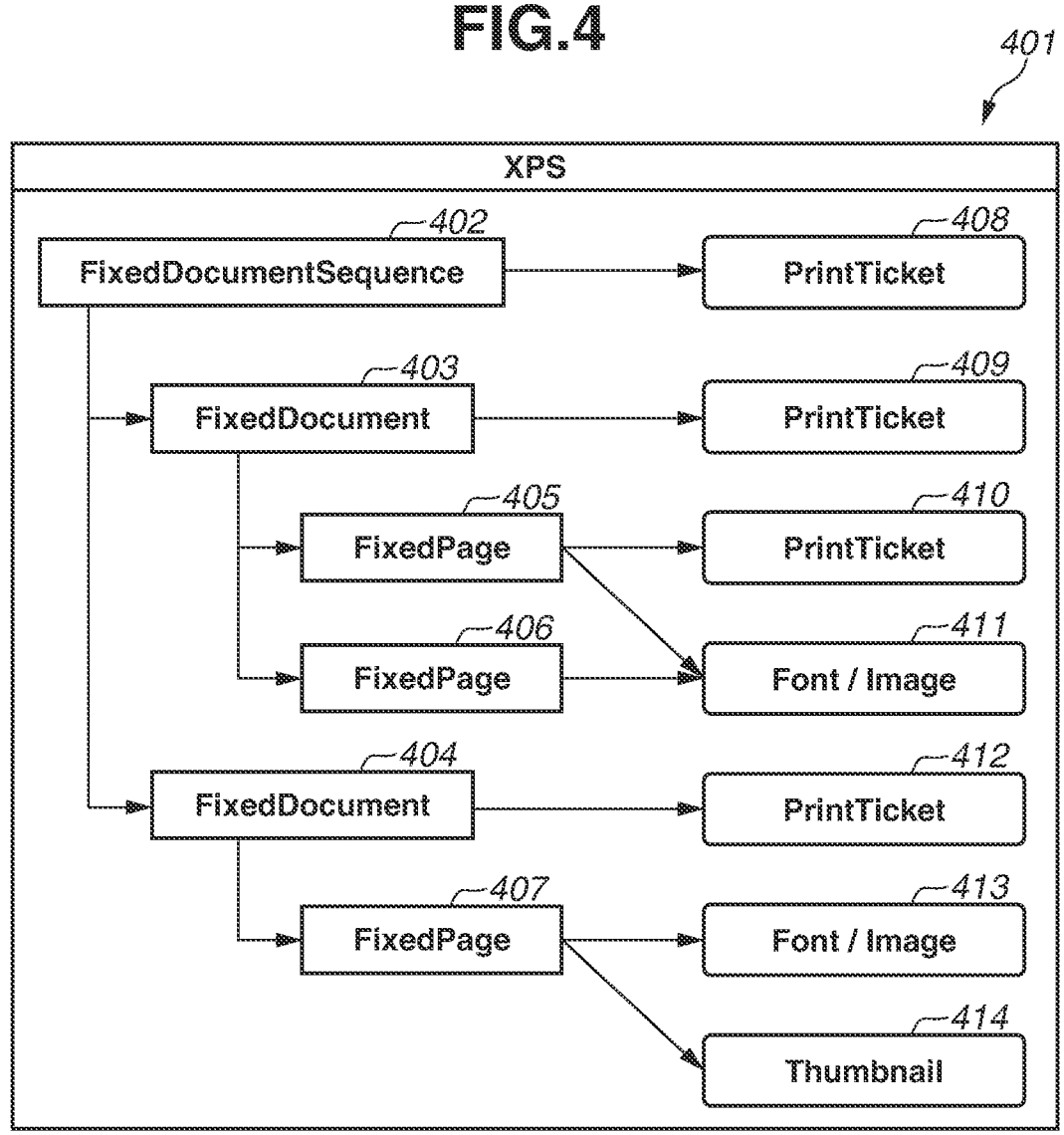
FIG. 4 is a diagram illustrating a concept of a logical structure of eXtended Markup Language (XML) Paper Specification (XPS).

FIG. 4 illustrates an example of a block diagram illustrating a logical structure of an XPS document. The logical structure of an XPS document 401 is a tree structure including an FDS 402 as the root. The FDS 402 has FDs 403 and 404 as child FDs. The FD 403 has FPs 405 and 406 as child FPs. The FD 404 has an FP 407 as a child FP. For a PrintTicket describing print settings, the FDS 402 holds a PrintTicket 408. The FD 403 holds a PrintTicket 409, the FP 405 holds a PrintTicket 410, and the FD 404 holds a PrintTicket 412. The PrintTicket 408 of the FDS 402 corresponds to a PrintTicket of a job. Each of the PrintTicket 409 of the FD 403 and the PrintTicket 412 of the FD 404 corresponds to PrintTickets of the document. The PrintTicket 410 of the FP 405 in the lower-level layer corresponds to a PrintTicket of the page.

Referring to FIG. 4, the FPs 406 and 407 do not hold a PrintTicket. A PrintTicket to be used, for example, when the FP 405 is printed is a PrintTicket as a result of merging the PrintTicket 408, the PrintTicket 409, and the PrintTicket 410. Each of the FPs 406 and 407 that do not hold a PrintTicket uses a PrintTicket in the higher-level layer. For example, a PrintTicket to be used when printing the FP 406 is a PrintTicket as a result of merging the PrintTicket 408 and the PrintTicket 409.

Referring to FIG. 4, the FPs 405 and 406 share a resource 411 including fonts and images, and the FP 407 uses a resource 413 including fonts and images. The FP 407 also holds a thumbnail image 414.

<Data Flow>

According to a first exemplary embodiment, the GUI application 205 provides a print preview function. More specifically, the GUI application 205 provides a screen including a print preview image. To correctly display a print result by the print preview function, it is necessary to reflect a result of the layout processing performed by the printer driver 201. Thus, it is desirable that the printer driver 201 generates a print preview image.

However, the GUI application 205 is activated upon reception of a print request from a drawing application 501 based on a user instruction. Then, the GUI application 205 outputs an XPS document as print data and ends processing. Then, after the output XPS document is stored in the spool file 206, the printer driver 201 starts processing. More specifically, since the GUI application 205 ends before the printer driver 201 starts processing, the printer driver 201 and the GUI application 205 cannot operate in a cooperative way. More specifically, since the GUI application 205 ends before the printer driver 201 is activated, the GUI application 205 cannot receive the image generated by the printer driver 201 and hence cannot display the image generated by the printer driver 201.

According to the present exemplary embodiment, therefore, the printer driver 201 issues a print request to re-activate the GUI application 205 to enable the GUI application 205 to use the image generated by the printer driver 201.

Figure 5A:
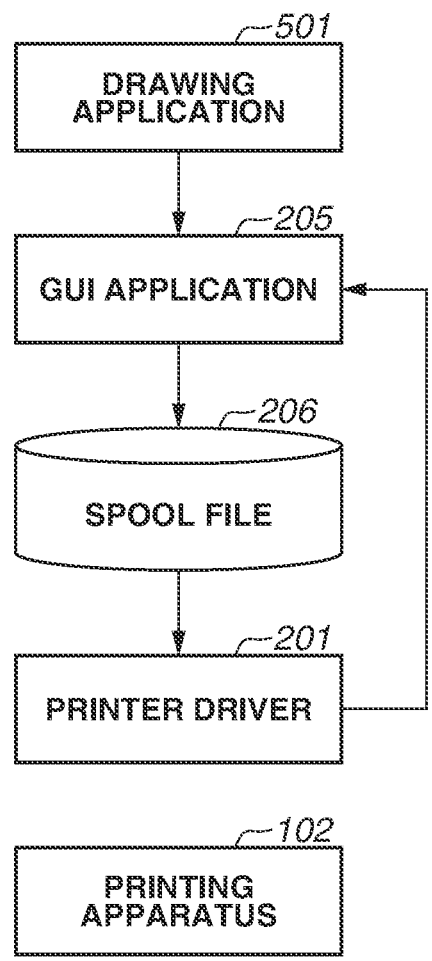
FIGS. 5A and 5B are flowcharts illustrating data flows according to a first exemplary embodiment.
Figure 5B:
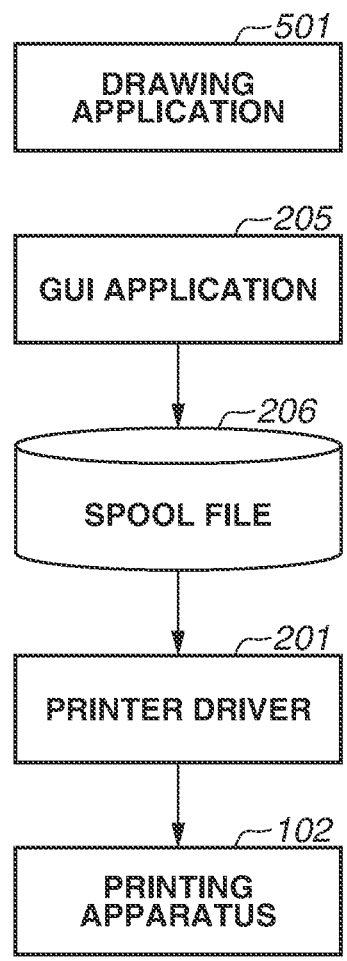

FIGS. 5A and 5B are diagrams illustrating data flows according to the first exemplary embodiment. FIG. 5A illustrates a data flow up to the first driver processing. In response to a user instruction, the drawing application 501 issues a print request to the printer driver 201 corresponding to the printing apparatus 102 to be used. The drawing application 501 is used as a generic name of the UWP application 202 and the Legacy application 203. Upon reception of the print request from the drawing application 501, the GUI application launcher 204 activates the GUI application 205.

The GUI application 205 acquires a PrintTicket and checks whether there exists information indicating that a print preview activation instruction is effective. When the print preview function is set to ON in the setting screen illustrated in FIG. 3B, the information indicating that the print preview activation instruction is effective is described in a PrintTicket. When the PrintTicket includes the information indicating that the print preview activation instruction is effective, the GUI application 205 edits the PrintTicket to instruct the printer driver 201 to generate a print preview image. Thus, the GUI application 205 adds information indicating an image generation instruction to the PrintTicket. Then, the GUI application 205 outputs the XPS document including the PrintTicket after the editing. When the GUI application 205 outputs the XPS document, the OS stores the XPS document as the spool file 206. When the XPS document is stored in the spool file 206, the printer driver 201 starts processing.

The printer driver 201 checks whether the information indicating the image generation instruction stored by the GUI application 205 exists in the PrintTicket (more specifically, whether the information indicating the image generation instruction is described in the PrintTicket). When the information indicating the image generation instruction exists, the printer driver 201 generates an image based on the drawing data and the PrintTicket in the XPS document. The generated image reflects the layout processing according to the print settings. Then, the printer driver 201 stores the generated image in the XPS document. In addition, the printer driver 201 performs editing for adding the storage information for the image to the PrintTicket. Then, the printer driver 201 issues a print request by using the generated XPS document to the printer driver 201 itself. In response to the print request from the printer driver 201, the GUI application launcher 204 re-activates the GUI application 205. After issuing a print request, the printer driver 201 cancels the job currently being processed and then ends processing.

FIG. 5B illustrates a data flow performed after the second and subsequent activations of the GUI application 205. The GUI application 205 checks the PrintTicket and determines whether the storage information for the image exists in the PrintTicket. When the storage information for the image is described in the PrintTicket, the GUI application 205 acquires the image data from the XPS document. The GUI application 205 displays a print preview screen by using the acquired image data. User interfaces to be configured by the GUI application 205 to provide a print preview function will be described in detail below with reference to FIG. 7.

The user confirms the image of the print result and issues a printing start or printing cancel instruction in the print preview screen. When the user issues a printing cancel instruction in the print preview screen, the GUI application 205 issues a printing cancel instruction to the OS and ends the corresponding print job processing. When the user issues a printing start instruction, the GUI application 205 outputs the XPS document. The GUI application 205 does not include the image generation instruction in a PrintTicket stored in the XPS document to be output.

When the GUI application 205 outputs the XPS document, the OS stores the XPS document as the spool file 206, and the processing of the printer driver 201 is re-activated. The printer driver 201 checks the PrintTicket included in the XPS document to check whether the information indicating the image generation instruction is included therein. The information indicating the image generation instruction is not described in the PrintTicket stored in the XPS document stored in the spool file 206 in the second processing. Thus, the printer driver 201 generates a print command that can be interpreted by the printing apparatus 102, based on the XPS document, and transmits the print command to the printing apparatus 102. The printing apparatus 102 performs printing according to the received print command.

<Contents of PrintTicket>

FIGS. 6A to 6C are diagrams illustrating examples of instruction information stored in a PrintTicket. FIG. 6A illustrates an example of information indicating the print preview activation instruction (print preview execution instruction). Referring to FIG. 6A, a PrintTicket describes "ON" for Option of setting item "JobPreview" corresponding to the print preview function. This indicates that the print preview activation instruction is effective. To set Option to "ON", the user sets the preview function to ON in a setting screen provided by the WSDA 207 or the PEX 209 before issuing a printing request from the drawing application 501. Thus, the configuration module 208 generates the PrintTicket including setting item "JobPreview" illustrated in FIG. 6A.

FIG. 6B illustrates an example of a preview image generation instruction issued by the GUI application 205 to instruct the printer driver 201 to generate a preview image. The GUI application 205 can include information indicating the image generation instruction in a PrintTicket by providing Property "CreatePrvImage" and setting "Request" to Value in the PrintTicket. This enables instructing the printer driver 201 to generate a preview image.

FIG. 6C illustrates an example of storage information for a preview image that is used by the printer driver 201 to notify the GUI application 205 that a preview image has been generated. The printer driver 201 can include storage information for an image in a PrintTicket by using the same Property as the preview image generation instruction and setting "Created" to Value. This enables notifying the GUI application 205 that the image has been stored.

Figure 7:
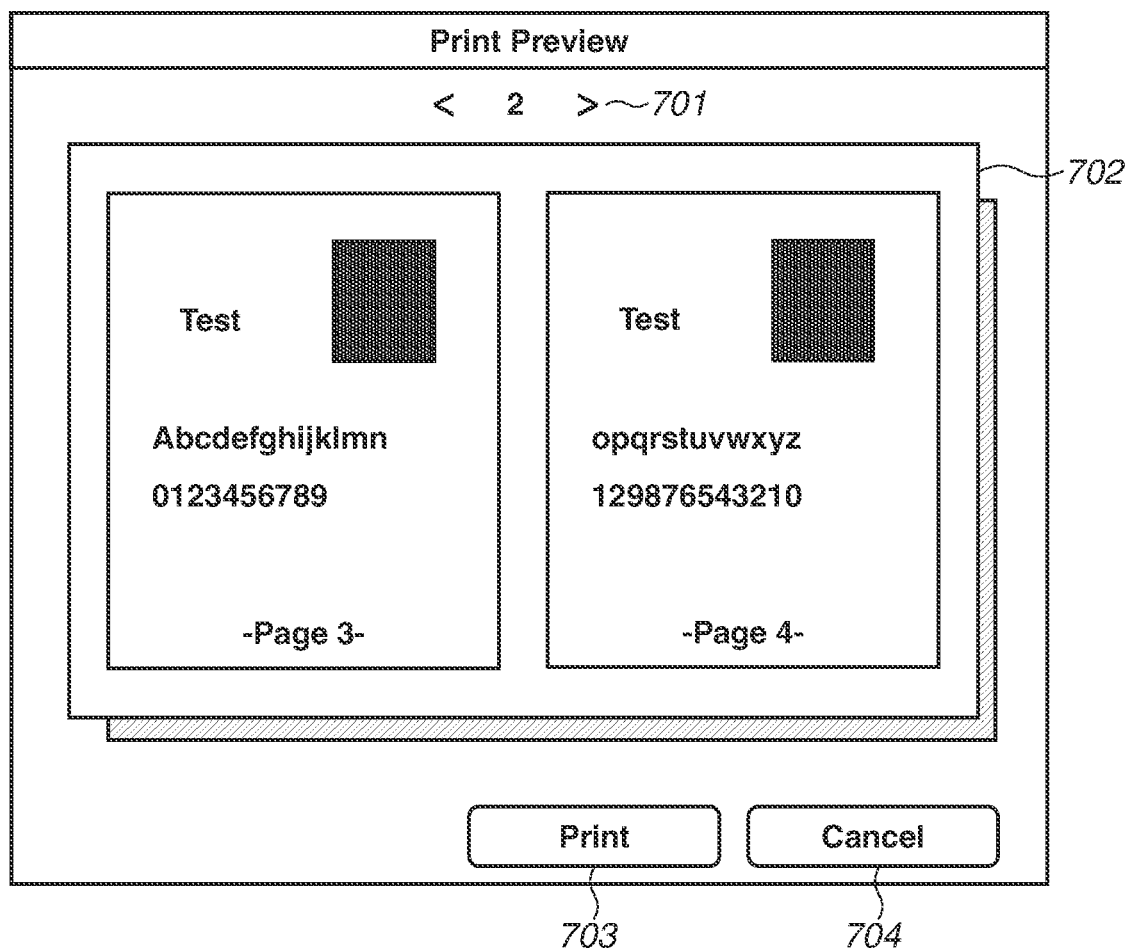
FIG. 7 is a diagram schematically illustrating a user interface for a print preview function.

FIG. 7 is a diagram illustrating an example of a print preview screen provided by the GUI application 205. A display item 701 is a control item for changing a page to be displayed on the print preview. This control item allows the user to change a page to be displayed and check the total number of pages subjected to printing based on the current print data and print settings. A print preview image 702 is a display item indicating the image of the print result of the specified page. A print button 703 is a display item for starting printing. A cancel button 704 is a display item, and when the user presses the button, subsequent print processing is canceled.

<Setup Processing of GUI Application>

Figure 8:
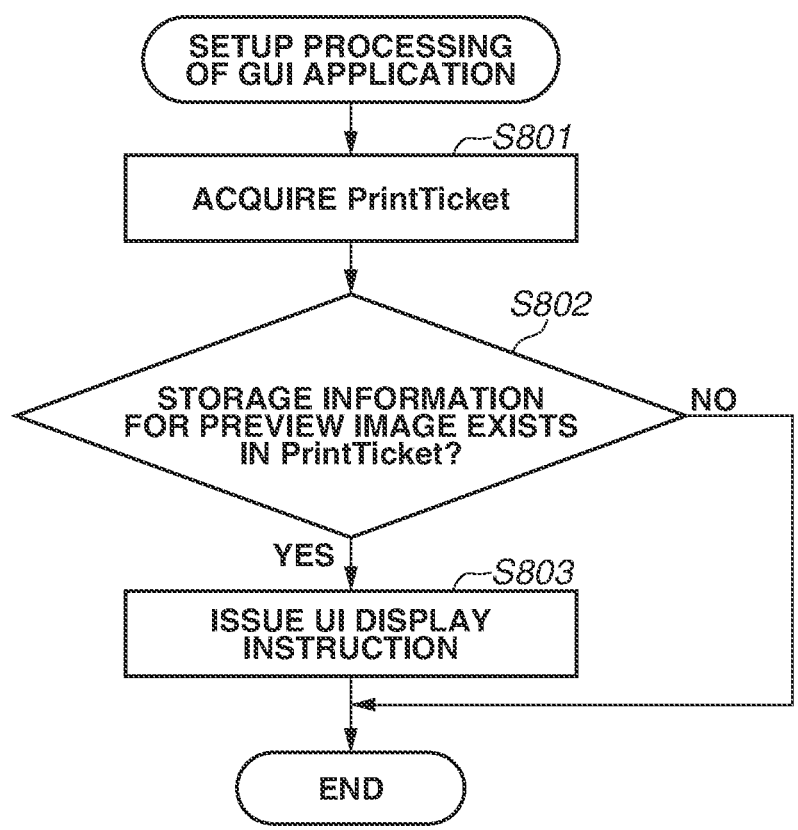
FIG. 8 is a flowchart illustrating setup processing of a Graphical User Interface (GUI) application according to the first exemplary embodiment.

FIG. 8 is a flowchart illustrating the main processing procedures of setup processing of the GUI application 205 in the present printing system. While the GUI application 205 will be described below as the subject of each piece of processing, the corresponding function is actually implemented when the CPU 111 executes the corresponding program. Not all of processing is sequentially performed on a single process. In some cases, control may be once transferred to the OS side, and then the process may be called again from the OS. FIG. 8 is a simple flowchart illustrating the main processing of the GUI application 205 for convenience of explanation.

Upon reception of an XPS document output from the drawing application 501 as a printing request source, the GUI application launcher 204 activates the GUI application 205 associated with the printing apparatus 102. When activated, the GUI application 205 firstly performs initialization processing. When a print button 703 is selected in the setting screen 302 provided by the OS after the print settings described above with reference to FIGS. 3A to 3C are made, a print request is issued, and an XPS document is output from the drawing application 501. In the initialization processing, the GUI application 205 registers the setup processing illustrated in FIG. 8 and the edit and end processing illustrated in FIG. 10 (described below) as event handlers prescribed by the OS. When the GUI application 205 completes the initialization processing, the OS performs the setup processing of the GUI application 205 registered as a prescribed event handler. FIG. 8 illustrates the setup processing.

In step S801, the GUI application 205 acquires a PrintTicket stored in the XPS document. The acquired PrintTicket in this case is a PrintTicket of a job. As described above with reference to FIG. 2, the PrintTicket as data including information indicating the print settings is generated by the configuration module 208, based on the print settings specified by the user. The PrintTicket can be acquired by calling a predetermined Application Programming Interface (API) of the OS.

In step S802, the GUI application 205 refers to the PrintTicket and checks whether the storage information for the preview image illustrated in FIG. 6C exists in the PrintTicket. When the storage information for the preview image exists in the PrintTicket (YES in step S802), the processing proceeds to step S803. In step S803, the GUI application 205 displays the print preview since the GUI application 205 is activated for the second time for the requested print job. In step S803, the GUI application 205 calls a prescribed API provided by the OS and instructs the API to display a user interface. Meanwhile, when the storage information for the preview image does not exist in the PrintTicket (NO in step S802), the GUI application 205 ends the setup processing without instructing the API to display a user interface since the GUI application 205 is activated for the first time for the requested print job. This completes the setup processing of the GUI application 205.

<UI Processing of GUI Application>

Figure 9:
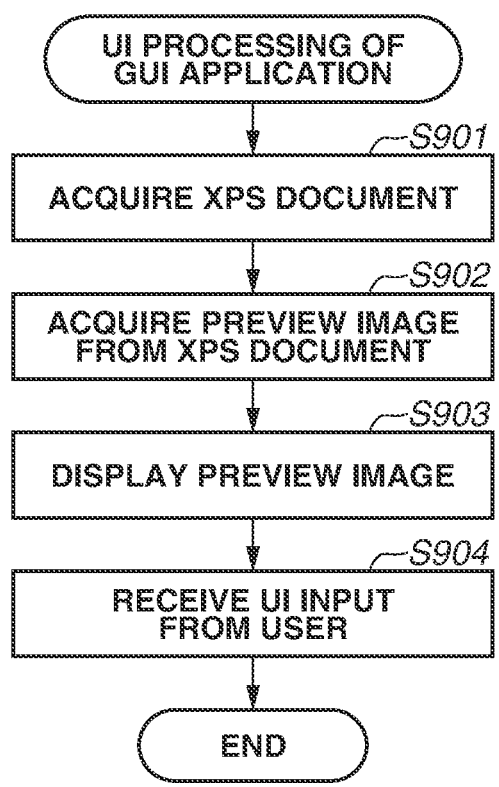
FIG. 9 is a flowchart illustrating User Interface (UI) processing of the GUI application according to the first exemplary embodiment.

UI processing of the GUI application 205 will be described below. When the UI display instruction is issued in step S803, the OS calls the UI processing of the GUI application 205 after the setup processing of the GUI application 205 is completed. FIG. 9 is a flowchart illustrating the main processing procedure of the UI processing of the GUI application 205 in the present printing system. When the UI display instruction is not issued in step S803, the OS skips the UI processing illustrated in FIG. 9 and calls the edit and end processing (described below).

Although the GUI application 205 will be described below as the subject of each piece of processing, the corresponding function is actually implemented when the CPU 111 executes the corresponding program. Not all of processing is sequentially performed on a single process. In some cases, control may be once transferred to the OS side, and then the process may be called again from the OS. FIG. 9 is a simple flowchart illustrating the main processing of the GUI application 205 for convenience of explanation.

In step S901, the GUI application 205 acquires an XPS document by using a predetermined API of the OS. In step S902, the GUI application 205 analyzes the XPS document and acquires the image stored by the printer driver 201 from the XPS document. Then, in step S903, the GUI application 205 displays a screen including the image acquired in step S902 as a print preview image. Thus, the GUI application 205 implements the print preview function for allowing the user to check the image of the print result.

In step S904, the GUI application 205 receives an input from the user in the screen including the displayed print preview image. The user confirms the image of the print result by viewing the print preview image. If the image is what is intended by the user, the user issues a printing start instruction. Meanwhile, if the image is not what is intended by the user, the user issues a printing cancel instruction. Upon reception of the printing start or printing cancel instruction from the user, the GUI application 205 completes the UI processing. The following description will be made on the premise that the user issues a printing start instruction. When the user issues a printing cancel instruction, the GUI application 205 notifies the OS that the print job has been canceled and then ends the processing.

<Edit and End processing of GUI Application>

The edit and end processing of the GUI application 205 will be described below. Upon completion of the UI processing of the GUI application 205 illustrated in FIG. 9, the OS calls the edit and end processing of the GUI application 205 illustrated in FIG. 10. When the UI display instruction is not issued in step S803, the OS calls the processing illustrated in FIG. 10 without calling the UI processing of the GUI application 205 illustrated in FIG. 9.

Figure 10:
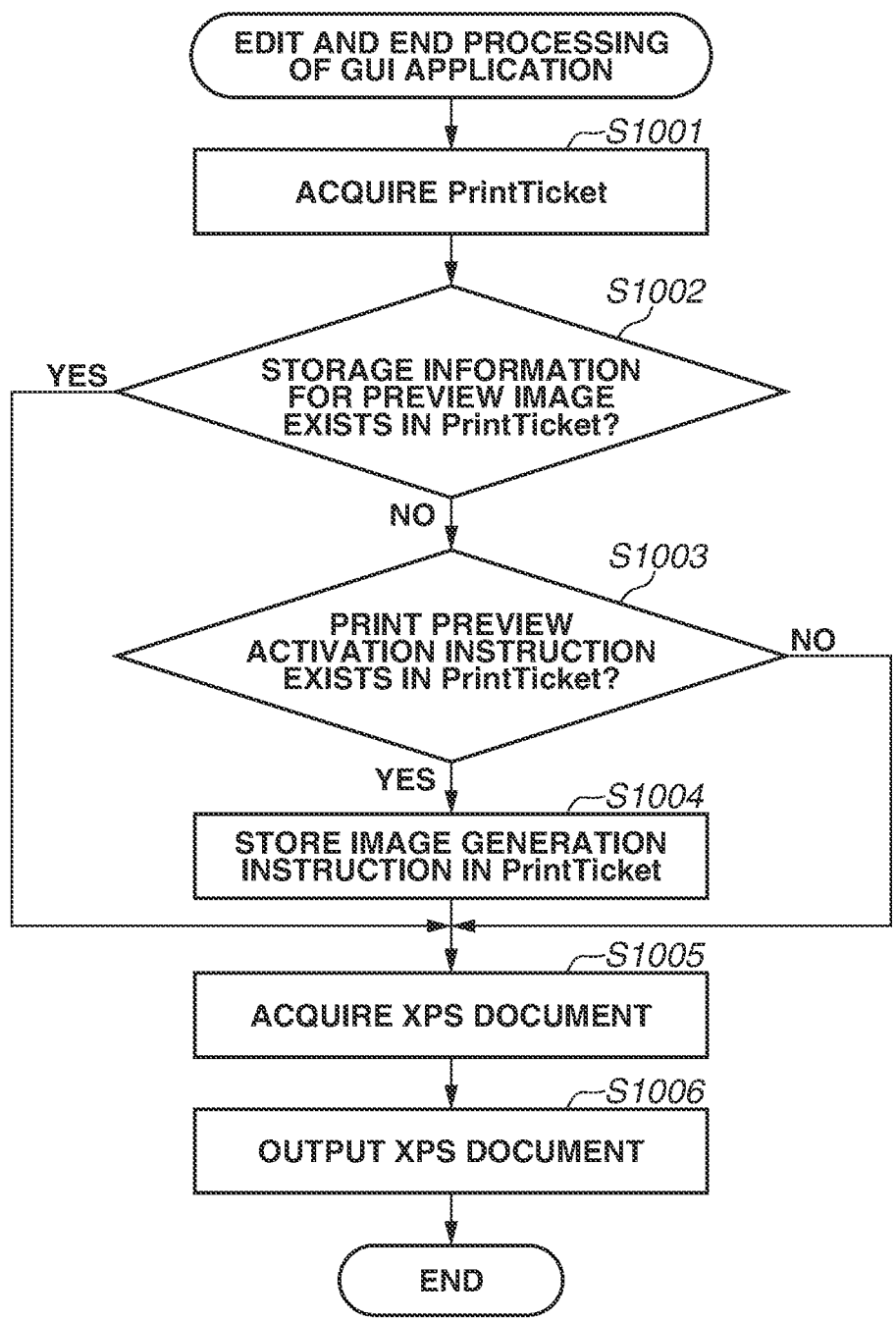
FIG. 10 is a flowchart illustrating end processing of the GUI application according to the first exemplary embodiment.

Although the GUI application 205 will be described below as the subject of each piece of processing, the corresponding function is actually implemented when the CPU 111 executes the corresponding program. Not all of processing is sequentially performed on a single process. In some cases, control may be once transferred to the OS side, and then the process may be called again from the OS. FIG. 10 is a simple flowchart illustrating the main processing of the GUI application 205 for convenience of explanation.

In step S1001, the GUI application 205 acquires a PrintTicket stored in the XPS document.

In step S1002, the GUI application 205 refers to the PrintTicket and checks whether the storage information for the preview image illustrated in FIG. 6C exists in the PrintTicket. When the storage information for the preview image exists in the PrintTicket (YES in step S1002), the GUI application 205 determines that the processing is end processing for the second activation. Then, the processing proceeds to step S1005. In step S1005, the GUI application 205 acquires the XPS document and outputs the XPS document as it is.

Meanwhile, when the storage information for the preview image does not exist in PrintTicket (NO in step S1002), the GUI application 205 determines that the processing is for the first activation, and the processing proceeds to step S1003. In step S1003, the GUI application 205 checks whether the information indicating that the print preview activation instruction (FIG. 6A) is effective exists in the PrintTicket. When the information indicating that the print preview activation instruction is effective exists in PrintTicket (YES in step S1003), the processing proceeds to step S1004. In step S1004, the GUI application 205 describes information indicating the image generation instruction in the PrintTicket to instruct the printer driver 201 to generate a preview image. Meanwhile, when the information indicating that the print preview activation instruction is effective does not exist in PrintTicket (NO in step S1003), the processing proceeds to step S1005. In step S1005, the GUI application 205 acquires the XPS document and outputs the XPS document as it is.

Steps S1005 and S1006 are procedures for XPS document acquisition processing and XPS document output processing, respectively. In step S1005, since the GUI application 205 needs to perform the output processing for the XPS document to enable the printer driver 201 to start processing, the GUI application 205 acquires the XPS document by using a predetermined API of the OS. In step S1006, the GUI application 205 outputs the XPS document acquired in step S1005 by using a predetermined API of the OS. Upon completion of the output processing for the XPS document, the GUI application 205 ends.

<Printer Driver Processing>

Processing of the printer driver 201 will be described below. In step S1006, the GUI application 205 outputs the XPS document, and the OS stores the XPS document as the spool file 206. Then, the printer driver 201 starts processing.

Figure 11:
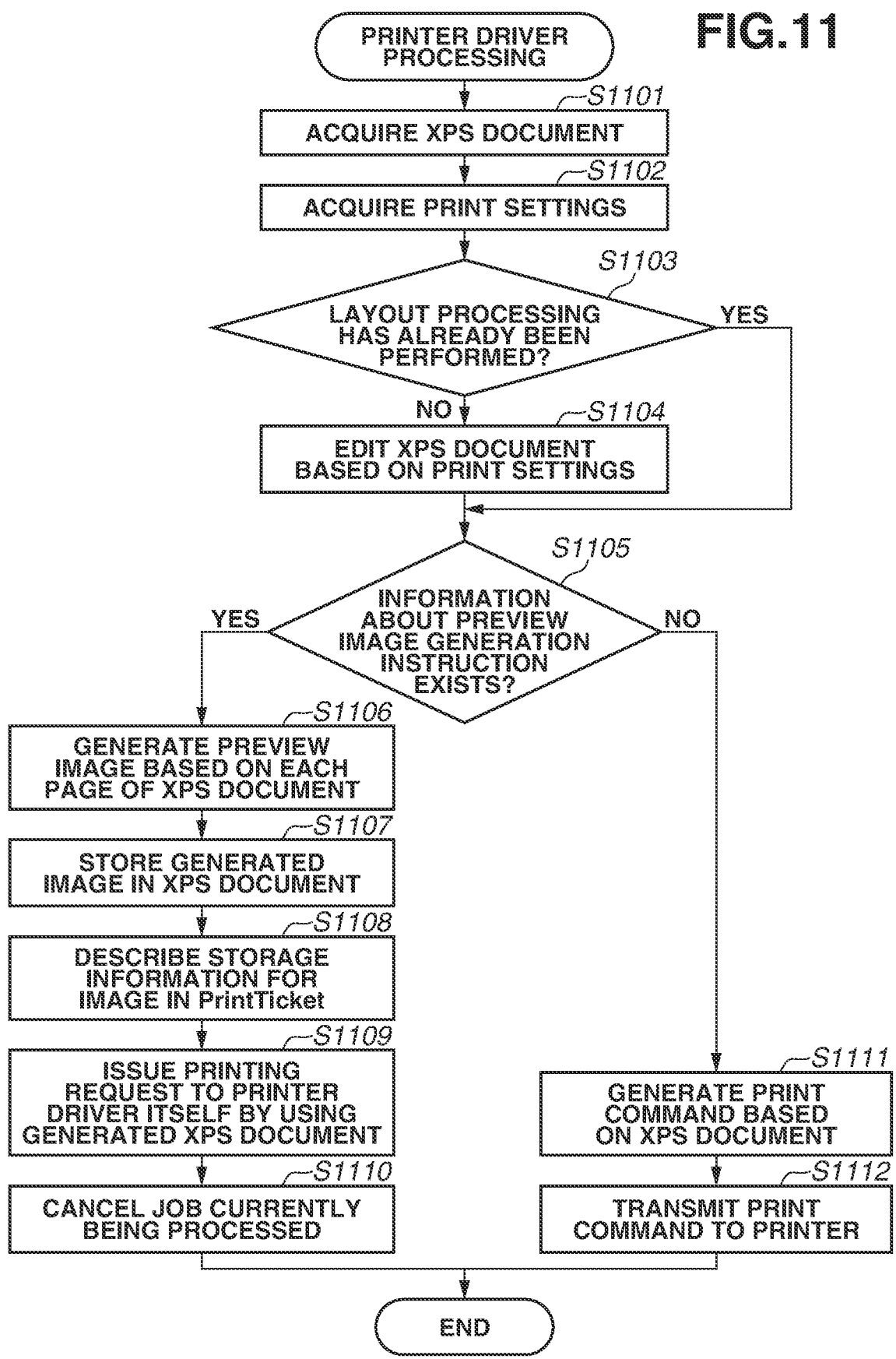
FIG. 11 is a flowchart illustrating printer driver processing according to the first exemplary embodiment.

FIG. 11 is a flowchart illustrating the main processing procedure of the printer driver 201 of the present printing system. Although the printer driver 201 will be described below as the subject of each piece of processing, the corresponding function is actually implemented when the CPU 111 executes the corresponding program. Not all of processing is sequentially performed on a single process. In some cases, control may be once transferred to the OS side, and then the process may be called again from the OS. FIG. 11 is a simple flowchart illustrating the main processing of the printer driver 201 for convenience of explanation.

In step S1101, the printer driver 201 acquires the XPS document stored as the spool file 206. In step S1102, the printer driver 201 acquires print setting values from a PrintTicket stored in the XPS document. In step S1103, the printer driver 201 determines whether the XPS document has been subjected to the layout processing based on the acquired print setting values. For example, when "Created" is set for "CreatePrvImage", it can be determined that, since the first driver processing is completed, the layout processing has been also completed.

According to the present exemplary embodiment, in the first driver processing, the printer driver 201 performs the layout processing for the XPS document to generate a print preview image. Then, the printer driver 201 issues a print request by using the XPS document. More specifically, in the second driver processing to be performed based on a print request of the printer driver 201 itself, the XPS document that has been subjected to the layout processing is spooled, the layout processing needs to be skipped. The printer driver 201 can use the XPS document before the editing for a print request to perform the layout processing in the second processing of the printer driver 201.

When the printer driver 201 determines that the XPS document has not been subjected to the layout processing (NO in step S1103), the processing proceeds to step S1104. In step S1104, the printer driver 201 performs the layout processing for the drawing data according to the PrintTicket. For example, a layout printing for printing a plurality of pages on a single paper surface is set, the printer driver 201 performs the layout processing for laying out a plurality of pages for the drawing data in the XPS document on a single page.

In S1105, the printer driver 201 determines whether information indicating that the preview image generation instruction (FIG. 6B) exists in the PrintTicket.

When the printer driver 201 determines that the information indicating that the preview image generation instruction exists in the PrintTicket (YES in step S1105), the processing proceeds to step S1106. In step S1106, the printer driver 201 generates a preview image based on each page of the drawing data that has been subjected to the layout processing in the XPS document. In step S1106, for example, when setting information for monochrome printing is included, the printer driver 201 generates a monochrome preview image reflecting the information.

In step S1107, the printer driver 201 embeds the generated image data in the XPS document. More specifically, the printer driver 201 stores the generated preview image data in the intermediate data. Methods for embedding image data in an XPS document include a method in which image data is associated with each page as a thumbnail.

In step S1108, the printer driver 201 describes in the PrintTicket the storage information for the image indicating that the preview image has been stored, illustrated in FIG. 6C. This enables the GUI application 205 to refer to the storage information for the image in steps S801 and S1002 to determine that a preview image is embedded in the XPS document.

In step S1109, the printer driver 201 issues a print request to the printer driver 201 itself by using the XPS document including the preview image. When the GUI application 205 is activated by using the print request from the printer driver 201 as a trigger, the above-described processing illustrated in FIGS. 8 to 10 is activated as the second processing of the GUI application 205. When the printer driver 201 issues a print request, then in step S1110, the printer driver 201 cancels the job currently being processed and completes the processing.

When the printer driver 201 determines that the information indicating that the preview image generation instruction does not exist in the PrintTicket (NO in step S1105), the processing proceeds to step S1111. In step S1111, the printer driver 201 generates a print command that can be interpreted by printers, based on the acquired XPS document.

In step S1112, the printer driver 201 transmits the generated print command to the printing apparatus 102. The printing apparatus 102 performs printing according to the received print command.

As described above, the GUI application 205 according to the present exemplary embodiment is activated for the second time upon reception of a print request from the printer driver 201. Accordingly, the cooperation with the printer driver 201 is achieved. This enables the GUI application 205 to perform a print preview by using the image generated by the printer driver 201, and therefore it is possible to provide the user with the correct image of a print result.

While, in the present exemplary embodiment, the GUI application 205 stores the print preview image generated by the printer driver 201 in the XPS document, the print preview image may be stored in any location that can be accessed by the GUI application 205. For example, the printer driver 201 can store the generated image at an arbitrary location, and notify the GUI application 205 of the storage location by describing the storage location in the storage information for the preview image.

Second Exemplary Embodiment

A second exemplary embodiment will be described below. The second exemplary embodiment will be described below centering on a method in which the GUI application 205 monitors the printer status and issues a status notification.

In the following descriptions, descriptions common to the first exemplary embodiment will be omitted. In particular, the hardware configuration of the printing system described above with reference to FIG. 1 and the configuration of the driver printing system described above with reference to FIG. 2 are similar to those according to the first exemplary embodiment. The setting screens described above with reference to FIGS. 3A to 3C and the configuration of the XPS document described above with reference to FIG. 4 are similar to those according to the first exemplary embodiment, and redundant descriptions thereof will be omitted. Portions different from the first exemplary embodiment will be mainly described below.

When the GUI application 205 makes an attempt to issue a status notification for the job currently being printed, it is necessary that the GUI application 205 is active while the printing apparatus 102 is performing print processing. However, since the printer driver 201 that transmits a print command to the printing apparatus 102 operates after the GUI application 205 ends, the GUI application 205 has ended when the printing apparatus is operating. This means that the printer driver 201 cannot issue a status notification.

Thus, according to the present exemplary embodiment, the printer driver 201 issues a print request to the printer driver 201 itself to re-activate the GUI application 205. In this case, the printer driver 201 adds job identification information added to the transmitted print command to the XPS document to be used for a print request. This prompts the GUI application 205 to access the printing apparatus 102 and issue a status notification of the job corresponding to the specified job identification information.

<Data Flow>

Figure 12:
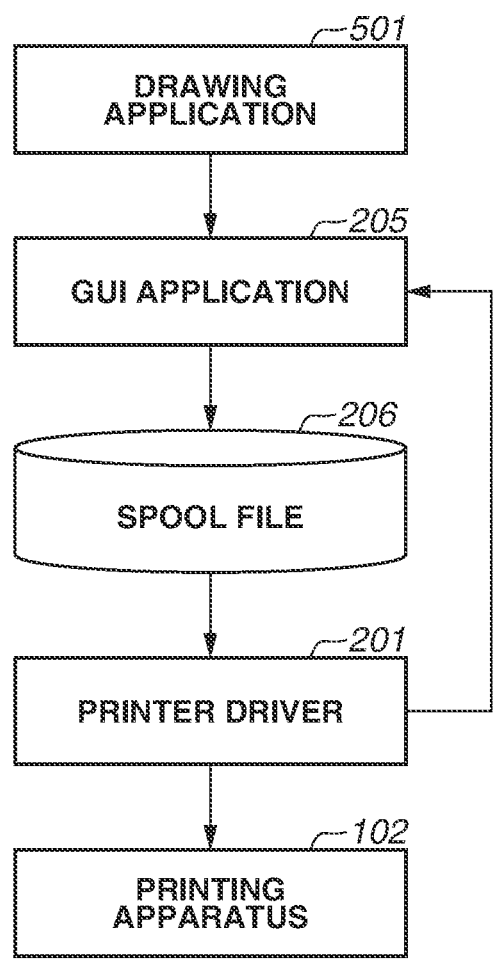
FIG. 12 is a flowchart illustrating a data flow according to a second exemplary embodiment.

FIG. 12 is a flowchart illustrating an example of a data flow according to a second exemplary embodiment. In response to a user instruction, the drawing application 501 issues a print request to the printer driver 201 corresponding to the printing apparatus 102 to be used. Upon reception of the print request from the drawing application 501, the GUI application launcher 204 activates the GUI application 205. In the first activation, the GUI application 205 outputs an acquired XPS document as it is. When the GUI application 205 outputs the XPS document, the OS stores the XPS document as the spool file 206.

When the XPS document is stored in the spool file 206, the printer driver 201 starts processing. The printer driver 201 generates a print command that can be interpreted by the printing apparatus 102, based on the XPS document, and transmits the print command to the printing apparatus 102. The print command includes job identification information. When the printing apparatus 102 receives a status acquisition request, the printing apparatus 102 returns status information in association with the job identification information. The status information will be described in detail below with reference to FIG. 14. The printing apparatus 102 performs print processing according to the received print command.

Then, the printer driver 201 issues a print request to the printer driver 201 itself. In this case, the printer driver 201 stores the job identification information in a PrintTicket stored in the XPS document to be used for a print request. The job identification information to be stored in the PrintTicket will be described below with reference to FIG. 13. In response to the print request from the printer driver 201, the GUI application launcher 204 re-activates the GUI application 205. The GUI application 205 checks the PrintTicket stored in the acquired XPS document and acquires the job identification information stored by the printer driver 201. The GUI application 205 communicates with the printing apparatus 102 to acquire the status information. Based on the status information acquired from the printing apparatus 102, the GUI application 205 determines whether the job corresponding to the job identification information acquired from the PrintTicket is currently being processed by the printing apparatus 102. The GUI application 205 displays the status information while the job corresponding to the acquired job identification information is being processed by the printing apparatus 102. When the GUI application 205 determines that the printing apparatus 102 completes the processing for the job corresponding to the acquired job identification information, the GUI application 205 cancels the print job that has served as a trigger for re-activating the GUI application 205 and then ends the processing.

FIG. 13 is a diagram illustrating an example of job identification information to be stored in the PrintTicket by the printer driver 201. Referring to FIG. 13, the job identification information is defined with a Globally Unique Identifier (GUID) and stored in the PrintTicket as a character string. Referring to FIG. 13, a character string "0335BD29-C332-714B-810D-0A4570700A5E" corresponds to the job identification information. The printer driver 201 generates different job identification information for each job and stores the information in a print command to be transmitted to the printing apparatus 102. Upon reception of a status acquisition request, the printing apparatus 102 returns the job identification information in association with the information about the job currently being processed. Then, when issuing a print request that serves as a trigger for activating the GUI application 205, the printer driver 201 stores the job identification information in the PrintTicket stored in the XPS document. This enables the GUI application 205 to acquire the identification information for the job subjected to a status notification, and communicate with the printing apparatus 102 to issue a status information for the job corresponding to the identification information.

FIG. 14 illustrates an example of status information acquired from the printing apparatus 102. Upon reception of a status acquisition request from the outside, the printing apparatus 102 returns the status information. Referring to FIG. 14, the status information returned by the printing apparatus 102 includes job identification information 1401, job status information 1402, a job name 1403, a user name 1404 of the user who issued a job, information about the total number of pages 1405, and information about the page number currently being processed 1406. The GUI application 205 displays a screen including the status information acquired by the printing apparatus 102 to notifies the user of the status information.

Figure 15:
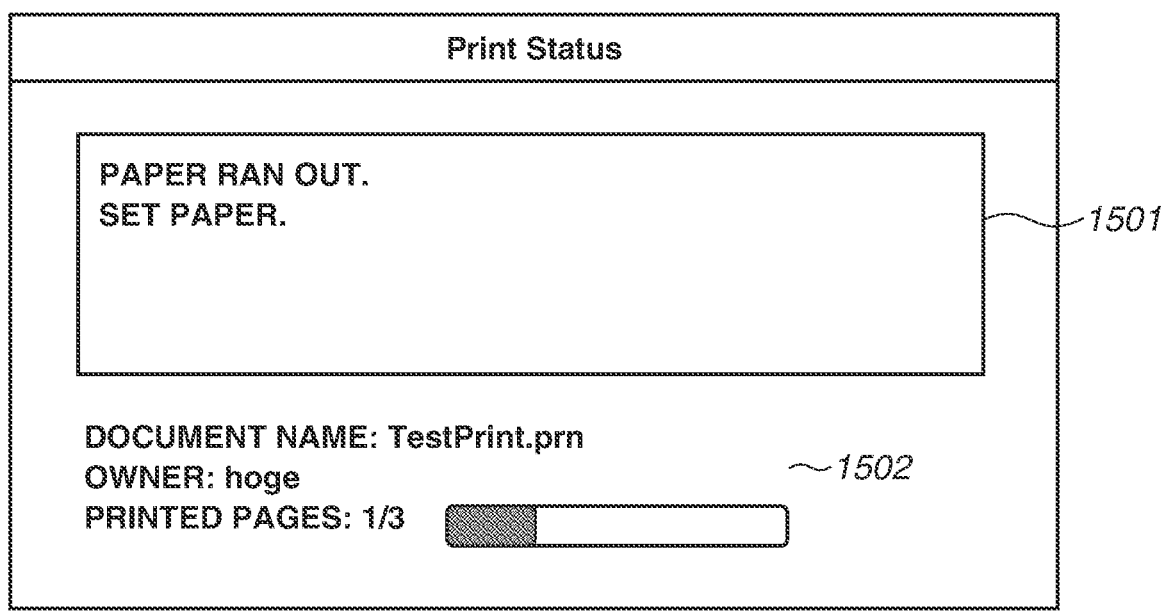
FIG. 15 is a diagram schematically illustrating a user interface for a status notification function.

FIG. 15 is a diagram illustrating an example of a status notification screen provided by the GUI application 205. The status notification screen illustrated in FIG. 15 includes a message display portion 1501 and a job information display portion 1502. The message display portion 1501 displays a message indicating the status of the printing apparatus 102, based on the status information acquired from the printing apparatus 102. The job information display portion 1502 displays information about the print job currently being executed by the printing apparatus 102, based on the status information acquired from the printing apparatus 102. The information about a print job includes, for example, the name of the job, the name of the user who issued the job, and the progress of the job.

<Setup Processing of GUI Application>

Figure 16:
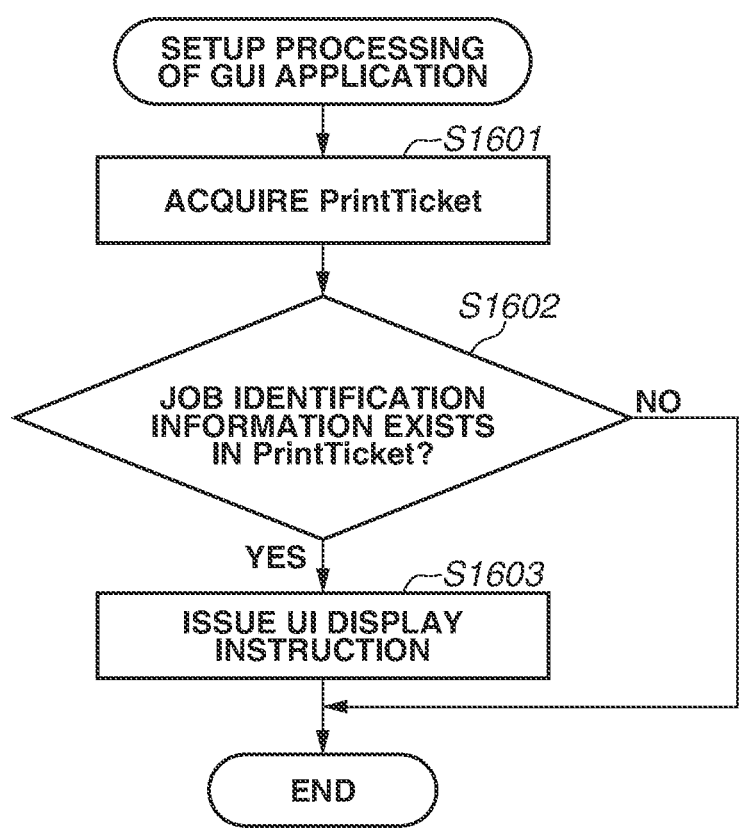
FIG. 16 is a flowchart illustrating setup processing of a GUI application according to the second exemplary embodiment.

FIG. 16 is a flowchart illustrating the main processing procedure of setup processing of the GUI application 205 according to the second exemplary embodiment. Although the GUI application 205 will be described below as the subject of each piece of processing, the corresponding function is actually implemented when the CPU 111 executes the corresponding program. Not all of processing is sequentially performed on a single process. In some cases, control may be once transferred to the OS side, and then the process may be called again from the OS. FIG. 16 is a simple flowchart illustrating the main processing of the GUI application 205 for convenience of explanation.

In step S1601, the GUI application 205 acquires a PrintTicket stored in XPS document.

In step S1602, the GUI application 205 refers to the PrintTicket to check whether the job identification information exists in the PrintTicket. When the job identification information exists in the PrintTicket (YES in step S1602), the GUI application 205 determines that the PrintTicket is a print request from the printer driver 201 (i.e., the second activation). Then, the processing proceeds to step S1603. In step S1603, the GUI application 205 instructs an API to display a user interface to issue status notification. Meanwhile, when the job identification information does not exist in PrintTicket (NO in step S1602), the GUI application 205 ends the setup processing without instructing the API to display a user interface because of the first activation.

<UI Processing of GUI Application>

UI processing of the GUI application 205 will be described below. When the UI display instruction is issued in step S1603, the OS calls the UI processing of the GUI application 205 after the setup processing of the GUI application 205 is completed. When the UI display instruction in step S1603 is not performed, the OS skips the UI processing illustrated in FIG. 17 and calls the edit and end processing (described below).

Figure 17:
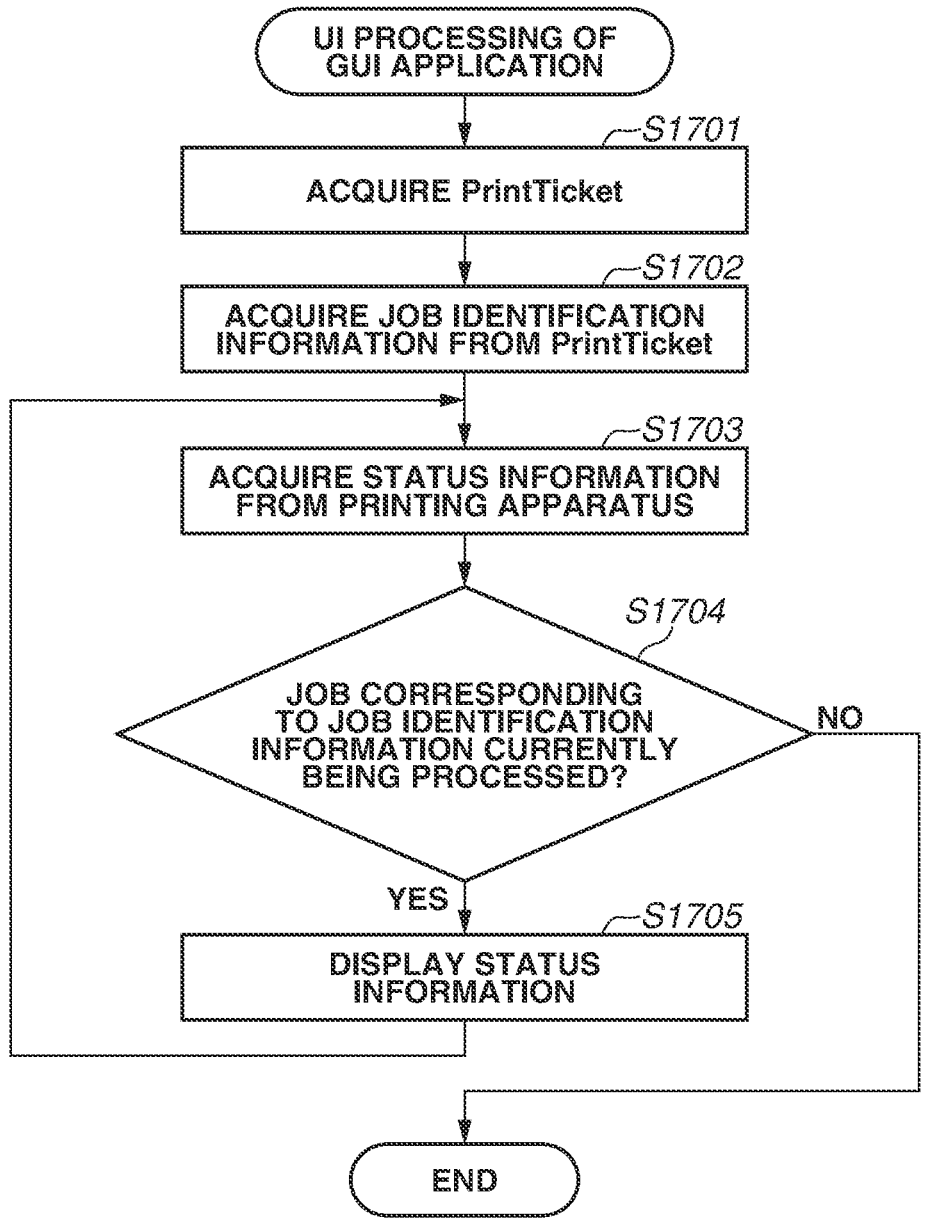
FIG. 17 is a flowchart illustrating UI processing of the GUI application according to the second exemplary embodiment.

FIG. 17 is a flowchart illustrating the main processing procedure of the UI processing of the GUI application 205 in the present printing system. Although the GUI application 205 will be described below as the subject of each piece of processing, the corresponding function is actually implemented when the CPU 111 executes the corresponding program. Not all of processing is sequentially performed on a single process. In some cases, control may be once transferred to the OS side, and then the process may be called again from the OS. FIG. 17 is a simple flowchart illustrating the main processing of the GUI application 205 for convenience of explanation.

In step S1701, the GUI application 205 acquires a PrintTicket stored in an XPS document. The acquired PrintTicket in this case is a PrintTicket of a job. In step S1702, the GUI application 205 acquires the job identification information from the PrintTicket. The GUI application 205 may acquire the job identification information when checking whether the job identification information exists in the setup processing, and store the job identification information in an accessible location in the UI processing.

In step S1703, the GUI application 205 communicates with the printing apparatus 102 to acquire the status information. In step S1704, the GUI application 205 refers to the acquired status information to determine whether the printing apparatus 102 is currently processing the job corresponding to the acquired job identification information. The GUI application 205 can determine whether the printing apparatus 102 is currently processing the job corresponding to the job identification information by checking whether the job identification information included in the status information acquired from the printing apparatus 102 coincides with the job identification information included in the PrintTicket.

When the printing apparatus 102 is currently processing the job corresponding to the job identification information (YES in step S1704), the processing proceeds to step S1705. In step S1705, the GUI application 205 extracts necessary information from the status information acquired from the printing apparatus 102 and displays the screen illustrated in FIG. 15. The GUI application 205 repeats steps S1703 to S1705 to continue the UI processing for status notification until the printing apparatus 102 completes the print processing for the job. Meanwhile, when the printing apparatus 102 is not currently processing the job corresponding to the job identification information (NO in step S1704), the GUI application 205 completes the UI processing.

<Edit and End Processing of GUI Application>

The edit and end processing of the GUI application 205 will be described below. After completion of the UI processing of the GUI application 205 illustrated in FIG. 17, the OS calls the edit and end processing of the GUI application 205 illustrated in FIG. 18. When the UI display instruction in step S1603 is not performed, the OS calls the edit and end processing without calling the UI processing of the GUI application 205 illustrated in FIG. 17.

Figure 18:
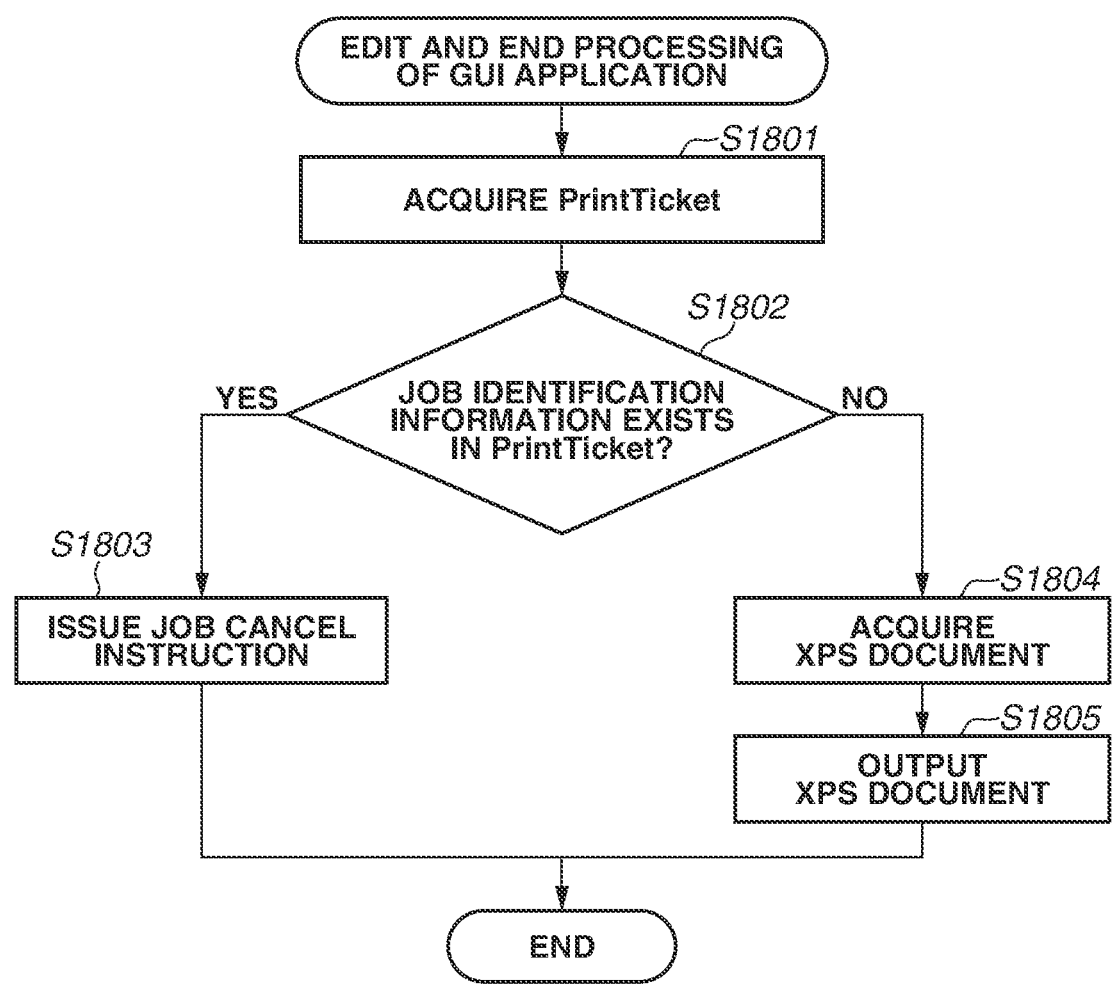
FIG. 18 is a flowchart illustrating end processing of the GUI application according to the second exemplary embodiment.

Although the GUI application 205 will be described below as the subject of each piece of processing, the corresponding function is actually implemented when the CPU 111 executes the corresponding program. Not all of processing is sequentially performed on a single process. In some cases, control may be once transferred to the OS side, and then the process may be called again from the OS. FIG. 18 is a simple flowchart illustrating the main processing of the GUI application 205 for convenience of explanation.

In step S1801, the GUI application 205 acquires a PrintTicket stored in the XPS document. The acquired PrintTicket in this case is a PrintTicket of a job.

In step S1802, the GUI application 205 checks whether the job identification information exists in the PrintTicket. When the job identification information exists in the PrintTicket (YES in step S1802), the GUI application 205 has been activated for the second time to issue a status notification. Then, the processing proceeds to step S1803. In step S1803, since printing is not actually required for the print request that has served as a trigger for activating the GUI application 205, the GUI application 205 issues a job cancel instruction.

Meanwhile, when the job identification information does not exist in the PrintTicket (NO in step S1802), the GUI application 205 determines that the PrintTicket is not a print request for a status notification from the printer driver 201 but a first print request that requires printing. Then, the processing proceeds to step S1804. In step S1804, the GUI application 205 acquires the XPS document. In step S1805, the GUI application 205 outputs the acquired XPS document. When the GUI application 205 outputs the XPS document, the OS stores the XPS document as the spool file 206. Then, the printer driver 201 starts processing.

<Printer Driver Processing>

Processing of the printer driver 201 will be described below. FIG. 19 is a flowchart illustrating the main processing procedure of the printer driver 201 in the present printing system. The processing of the printer driver 201 illustrated in FIG. 19 is started when the OS stores the XPS document output by the GUI application 205 in step S1805 illustrated in FIG. 18, as the spool file 206.

Although the printer driver 201 will be described below as the subject of each piece of processing, the corresponding function is actually implemented when the CPU 111 executes the corresponding program. Not all of processing is sequentially performed on a single process. In some cases, control may be once transferred to the OS side, and then the process may be called again from the OS. FIG. 19 is a simple flowchart illustrating the main processing of the printer driver 201 for convenience of explanation.

In step S1901, the printer driver 201 acquires the XPS document stored as the spool file 206. In step S1902, the printer driver 201 acquires print setting values from a PrintTicket added to XPS document. In step S1903, the printer driver 201 edits the XPS document, based on the acquired print setting value. In step S1904, the printer driver 201 generates a print command that can be interpreted by the printing apparatus 102, based on the edited XPS document.

The print command generated by the printer driver 201 includes the job identification information for identifying a job. In step S1905, the printer driver 201 transmits the generated print command to the printing apparatus 102. The printing apparatus 102 performs print processing according to the received print command.

In step S1906, the printer driver 201 generates the XPS document to be used for a print request that serves as a trigger for activating the GUI application 205 for the second time. In this case, the printer driver 201 stores the job identification information, which is included in the print command in S1904, in a PrintTicket to be added to the XPS document. A print job generated by a print request that serves as a trigger for re-activating the GUI application 205 is canceled by the GUI application 205 in step S1803. Thus, page data may have arbitrary contents.

Then, the printer driver 201 issues a print request to the printer driver 201 itself by using the generated XPS document. The GUI application 205 is activated upon reception of the print request from the printer driver 201 as a trigger, and the second processing is started. The GUI application 205 issues a status notification in the second activation.

As described above, the GUI application 205 according to the present exemplary embodiment is activated for the second time upon reception of a print request from the printer driver 201. The cooperation with print processing by the printer driver 201 is achieved in this way. This enables the GUI application 205 to acquire the status information indicating the status of the print processing of the printing apparatus 102 and display the status information, and therefore a status notification can be achieved.

Other Exemplary Embodiments

Each of the exemplary embodiments is implemented by performing the following processing. A storage medium storing program codes of software for implementing the function of the above-described exemplary embodiments is supplied to a system or apparatus. Then, a computer (including a CPU, a graphics processing unit (GPU), or a micro processing unit (MPU)) of the system or apparatus reads and executes the program codes stored in the storage medium. In this case, the program codes themselves read from the storage medium implement the functions of the above-described exemplary embodiments, and the storage medium storing the program codes is included in the present invention. Not all of the above-described processing needs to be implemented by software. Part or whole of the processing may be implemented by hardware such as an Application Specific Integrated Circuit (ASIC). The entire processing is not necessarily performed by a single CPU, but a plurality of CPUs may suitably perform processing in a cooperative way.

Examples of storage media for supplying program codes include a flexible disk, a hard disk, an optical disk, a magneto-optical (MO) disk, a compact disc read only memory (CD-ROM), a compact disc recordable (CD-R), a magnetic tape, a nonvolatile memory card, a ROM, and a digital versatile disc (DVD).

An OS operating on the computer may perform part or whole of actual processing, based on instructions of the program codes of the above-described exemplary embodiments. Further, program code read from a storage medium may be written in a memory included in a function expansion board inserted into the computer or a function expansion unit connected to the computer. Subsequently, a CPU included in the function expansion board or function expansion unit may perform part of whole of actual processing, based on instructions of the program codes.

The present invention is not limited to the above-described exemplary embodiments but can be modified and changed in diverse ways without departing from the spirit and scope thereof. Therefore, the following claims are appended to disclose the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control method for an information processing apparatus on which a Graphical User Interface (GUI) application capable of providing a GUI operates, the control method causes the GUI application to perform:

being activated in response to a first print request from a drawing application;

acquiring intermediate data based on drawing data generated by the drawing application; and outputting the intermediate data, wherein, in a case where a second print request is issued by a printer driver that has acquired the intermediate data output from the GUI application, the GUI application is re-activated in response to the second print request, and wherein, in a case where the GUI application is activated at least twice in response to the first print request and the second print request that are based on the drawing data that is identical drawing data, the GUI application does not provide a predetermined screen when activated based on the first print request and provides the predetermined screen when activated in response to the second print request issued by the printer driver.

2. The control method according to claim 1, wherein the GUI application that has been re-activated in response to the second print request provides a screen including a print preview image that is generated based on the intermediate data by the printer driver, as the predetermined screen.

3. The control method according to claim 2,
wherein, in a case where the print preview image is generated and the generated print preview image is stored in the intermediate data by the printer driver, storage information for the generated print preview image is added to information indicating print settings in the intermediate data, and
wherein the GUI application acquires the print preview image, based on the storage information, to provide a screen including the print preview image.

4. The control method according to claim 1,
wherein the control method further causes a computer to perform:
acquiring information indicating print settings; and
adding predetermined information to the information indicating the print settings,
wherein, in a case where the predetermined information is included in the information indicating the print settings, the second print request is output by the printer driver, and in a case where the predetermined information is not included in the information indicating the print settings, the second print request is not output by the printer driver.

5. The control method according to claim 4, wherein, in a case where a print preview execution instruction is included in the acquired information indicating the print settings, the GUI application adds the predetermined information to the information indicating the print settings.

6. The control method according to claim 1, wherein the GUI application that has been re-activated in response to the second print request provides a screen including information indicating a status of a printing apparatus, to which a print command generated based on the intermediate data has transmitted, as the predetermined screen.

7. The control method according to claim 6,
wherein the print command generated by the printer driver includes identification information for a print job, and
wherein information identical to the identification information for the print job included in the print command is stored in intermediate data that is generated by the printer driver for the second print request.

8. The control method according to claim 7, wherein the information identical to the identification information for the print job included in the print command is stored in the information indicating the status of the printing apparatus acquired from the printing apparatus that received the print command.

9. The control method according to claim 8,
wherein the GUI application that has been activated in response to the second print request determines whether a print job corresponding to the identification information is currently being processed by the printing apparatus, based on the intermediate data generated by the printer driver for the second print request and the information indicating the status acquired from the printing apparatus, and
wherein, in a case where the print job corresponding to the identification information is currently being processed by the printing apparatus, the GUI application provides a screen including the information indicating the status of the printing apparatus.

10. The control method according to claim 1,
wherein Device Metadata is acquired from an operating system (OS) via the Internet upon installation of the printer driver, and
wherein, based on descriptions in the acquired Device Metadata, the GUI application is acquired from an application distribution system via the Internet.

11. The control method according to claim 10, wherein the printer driver and the GUI application are associated with each other, based on device identification information described in the Device Metadata and identification information for the GUI application.

12. The control method according to claim 1, wherein the GUI application is activated when a printer driver not having a function of providing a GUI is selected.

13. The control method according to claim 1, wherein the printer driver is a V4 printer driver.

14. The control method according to claim 1, wherein the intermediate data is eXtended Markup Language (XML) Paper Specification (XPS) data including the drawing data and a PrintTicket.

15. An information processing apparatus on which a Graphical User Interface (GUI) application capable of providing a GUI operates, the information processing apparatus comprising:
an activation unit configured to activate the GUI application in response to a first print request from a drawing application;
an acquisition unit configured to cause the GUI application to acquire intermediate data based on drawing data that is generated by the drawing application; and
an output unit configured to output the intermediate data from the GUI application,
wherein, in a case where a second print request is issued by a printer driver that has acquired the intermediate data output from the GUI application, the GUI application is re-activated in response to the second print request, and
wherein, in a case where the GUI application is activated at least twice in response to the first print request and the second print request that are based on the drawing data that is identical drawing data, the GUI application does not provide a predetermined screen when activated based on the first print request and provides the predetermined screen when activated in response to the second print request issued by the printer driver.

* * * * *